(12) United States Patent
Murai

(10) Patent No.: US 7,688,408 B2
(45) Date of Patent: Mar. 30, 2010

(54) LIQUID CRYSTAL DEVICE AND ELECTRONIC APPARATUS

(75) Inventor: Ichiro Murai, Chino (JP)

(73) Assignee: Epson Imaging Devices Corporation (JP)

(*) Notice: Subject to any disclaimer, the term of this patent is extended or adjusted under 35 U.S.C. 154(b) by 458 days.

(21) Appl. No.: 11/532,629

(22) Filed: Sep. 18, 2006

(65) Prior Publication Data

US 2007/0064178 A1 Mar. 22, 2007

(30) Foreign Application Priority Data

Sep. 21, 2005 (JP) ............................. 2005-273310
Oct. 18, 2005 (JP) ............................. 2005-303257

(51) Int. Cl.
*G02F 1/1335* (2006.01)
(52) U.S. Cl. ..................................... 349/114
(58) Field of Classification Search ................ 349/114, 349/108
See application file for complete search history.

(56) References Cited

U.S. PATENT DOCUMENTS

| | | | | |
|---|---|---|---|---|
| 5,978,061 | A * | 11/1999 | Miyazaki et al. ............. | 349/155 |
| 6,023,315 | A * | 2/2000 | Harrold et al. .............. | 349/108 |
| 6,187,485 | B1 * | 2/2001 | Matsushima et al. ........... | 430/7 |
| 6,445,437 | B1 * | 9/2002 | Miyazaki et al. ............. | 349/156 |
| 6,801,283 | B2 * | 10/2004 | Koyama et al. ............. | 349/119 |
| 6,864,945 | B2 | 3/2005 | Fujimori et al. | |
| 7,298,450 | B2 * | 11/2007 | Fujimori et al. ............. | 349/156 |
| 7,317,211 | B2 * | 1/2008 | Watanabe et al. ............. | 257/98 |
| 7,399,574 | B2 * | 7/2008 | Hayashi et al. ............ | 430/287.1 |
| 7,538,840 | B2 * | 5/2009 | Fujimori et al. ............. | 349/114 |
| 2002/0075441 | A1 * | 6/2002 | Fujimori et al. ............. | 349/155 |
| 2003/0118922 | A1 * | 6/2003 | Hayashi et al. ................ | 430/7 |
| 2003/0210365 | A1 * | 11/2003 | Koyama et al. ............. | 349/113 |
| 2004/0076770 | A1 * | 4/2004 | Yamashita et al. ........... | 428/1.1 |
| 2004/0169797 | A1 | 9/2004 | Fujita et al. | |
| 2004/0169810 | A1 * | 9/2004 | Fujimori et al. ............. | 349/156 |
| 2004/0195576 | A1 * | 10/2004 | Watanabe et al. ............. | 257/79 |
| 2005/0179675 | A1 * | 8/2005 | Hekstra et al. .............. | 345/204 |
| 2006/0098316 | A1 * | 5/2006 | Tatsuzawa et al. .......... | 359/891 |
| 2006/0170712 | A1 * | 8/2006 | Miller et al. ................ | 345/695 |

(Continued)

FOREIGN PATENT DOCUMENTS

JP 04-149425 5/1992

(Continued)

*Primary Examiner*—K. Cyrus Kianni
(74) *Attorney, Agent, or Firm*—Harness, Dickey & Pierce, P.L.C.

(57) ABSTRACT

There is provided a liquid crystal device, wherein a liquid crystal layer is interposed between a first substrate and a second substrate, and at least a display pixel corresponding to a colored region of a color from blue to green in a visible light region of which the color varies depending on a wavelength is included, wherein at least one of the first substrate and the second substrate has a spacer which defines the thickness of the liquid crystal layer and an alignment film which is subjected to a rubbing process in a predetermined direction, and wherein a relative positional relationship between the spacer and the display pixel is defined such that a region of the alignment film, which is not subjected to the rubbing process due to existence of the spacer at the time of the rubbing process, is positioned in the display pixel corresponding to the colored region of the color from blue to green.

9 Claims, 19 Drawing Sheets

U.S. PATENT DOCUMENTS

2006/0229376 A1 * 10/2006 Hayashi et al. ................ 522/6
2008/0174725 A1 7/2008 Fujimori et al.

FOREIGN PATENT DOCUMENTS

| JP | 10-010847 | | 1/1998 |
| JP | 2002-072220 | | 3/2002 |
| JP | 2004-069826 | | 3/2004 |
| JP | 2004-069826 | * | 4/2004 |
| JP | 2004-252309 | | 9/2004 |

* cited by examiner

LIQUID CRYSTAL DEVICE AND ELECTRONIC APPARATUS

BACKGROUND

1. Technical Field

The present invention relates to a liquid crystal device and an electronic apparatus suitable for displaying various kinds of information.

2. Related Art

A semi-transmissive reflective type liquid crystal device for performing a reflective display mode using external light in a bright place and performing a transmissive display mode using illumination light emitted from a backlight as a light source in a dark place is known. In such a liquid crystal device, while the external light passes through a liquid crystal layer twice when the reflective display mode is performed, the illumination light passes through the liquid crystal layer only once when the transmissive display mode is performed.

Thus, in such a liquid crystal device, if the thickness (cell gap) of the liquid crystal layer is "d", the refractive-index anisotropy of the liquid crystal is "$\Delta n$", and the integration value thereof, that is, retardation of the liquid crystal is "$\Delta nd$", the retardation of the liquid crystal corresponding to a reflective region for performing the reflective display mode is "$2 \times \Delta nd$" because incident light passes through the liquid crystal layer twice and then reaches a viewer. In contrast, the retardation of the liquid crystal corresponding to the transmissive region for performing the transmissive display mode is "$1 \times \Delta nd$" because the illumination light from the backlight passes through the liquid crystal layer only once.

In such a liquid crystal device, a display property (gradation property) such as contrast or brightness varies depending on the case where the reflective display mode is performed and a case where the transmissive display mode is performed and, as a result, display quality deteriorates.

Accordingly, as a liquid crystal device for solving the problem, for example, a multi-gap type semi-transmissive reflective type liquid crystal device in which a step-difference film made of acrylic resin is provided at a position corresponding to a reflective region and a spacer is disposed on the step-difference film such that the thickness of a liquid crystal layer corresponding to the reflective region is less than that of the liquid crystal layer corresponding to the transmissive region to obtain high quality display is generally known.

As this kind of liquid crystal device, a liquid crystal device in which a columnar part (generally, also referred to as "photospacer") for uniformly maintaining the thickness (cell gap) of a liquid crystal layer interposed between an element substrate and an opposite substrate is provided at a predetermined position to reduce an alignment defect of liquid crystal is suggested (for example, see JP-A-2004-69826).

In the liquid crystal device disclosed in JP-A-2004-69826, a convex step-difference part is formed in a predetermined region including a reflective region and a columnar part is made of a transparent organic insulating material such as acryl and disposed at a position facing the convex step-difference part in a non-opening region of each pixel. A relative positional relationship between a color filter and the columnar part is defined such that a color filter of blue is positioned at a downstream side of a rubbing direction from the columnar part. In the liquid crystal device having such a configuration, at the time of a rubbing process, a rubbing-defective region occurs due to existence of the columnar part and thus an alignment defect of liquid crystal occurs in the region. Since the alignment defect is inconspicuous on a display when the alignment defect of the liquid crystal occurs in a pixel corresponding to the color filter of blue, in this liquid crystal device, the above-described object is realized by disposing the columnar part at the above-described position.

SUMMARY

An advantage of some aspects of the invention is to provide a liquid crystal device having a plurality of colored regions, which is capable of reducing deterioration of display quality in a rubbing-defective region on an alignment film which occurs due to existence of a spacer at the time of a rubbing process, and an electronic apparatus.

According to an aspect of the invention, there is provided a liquid crystal device, wherein a liquid crystal layer is interposed between a first substrate and a second substrate and at least a display pixel corresponding to a colored region of a color from blue to green in a visible light region of which the color varies depending on a wavelength is included, wherein at least one of the first substrate and the second substrate has a spacer which defines the thickness of the liquid crystal layer and an alignment film which is subjected to a rubbing process in a predetermined direction, and wherein a relative positional relationship between the spacer and the display pixel is defined such that a region of the alignment film, which is not subjected to the rubbing process due to existence of the spacer at the time of the rubbing process, is positioned in the display pixel corresponding to the colored region of the color from blue to green.

In this liquid crystal device, the liquid crystal layer is interposed between a first substrate and a second substrate and at least the display pixel corresponding to the colored region of the color from blue to green is included. At least one of the first substrate and the second substrate has the spacer which defines the thickness of the liquid crystal layer and the alignment film which is subjected to the rubbing process in a predetermined direction. In a suitable example, it is preferable that the spacer is formed by exposing and developing an organic insulating film made of acrylic resin or polyimide resin using a photolithography in a process of manufacturing the liquid crystal device. When the spacer has a cylindrical shape, the diameter thereof is about 10 to 20 µm and the thickness (height) thereof is about 3 to 6 µm.

Particularly, in this liquid crystal device, the relative positional relationship between the spacer and the display pixel is defined such that the domain region (which is a region in which liquid crystal molecules in the liquid crystal layer is not aligned in a predetermined direction and, hereinafter, referred to as "alignment-defective region of liquid crystal molecules") of the alignment film, which is not subjected to the rubbing process due to existence of the spacer at the time of the rubbing process, is positioned in the display pixel corresponding to the colored region of the color from blue to green, which hardly has influence on the vision of human. Accordingly, it is possible to allow the display of the alignment-defective region of the liquid crystal molecules to be inconspicuous at the time of driving the liquid crystal device and thus to prevent display quality from deteriorating due to the alignment-defective region of the liquid crystal molecules.

In a suitable example, it is preferable that the rubbing process is performed in a direction from the spacer to the display pixel corresponding to the colored region of the color from blue to green, based on the position of the spacer. It is preferable that the region, which is not subjected to the rubbing process, is positioned on an extension line of the direction of the rubbing process. It is preferable that the length of the region, which is not subjected to the rubbing process, in the direction of the rubbing process is greater than the thickness of the spacer and the width of the region, which is not subjected to the rubbing process, in a direction perpendicular to the direction of the rubbing process is equal to that of the spacer.

According to another aspect of the invention, there is provided a liquid crystal device, wherein a liquid crystal layer is interposed between a first substrate and a second substrate, and a reflective region which reflects light incident from one surface of the first substrate, a transmissive region which transmits light incident from one surface of the second substrate to the one surface of the first substrate, and a display pixel corresponding to a colored region of a color from blue to green are included, wherein at least one of the first substrate and the second substrate has a step-difference forming film which is provided at a position corresponding to the reflective region, a spacer which is provided on the step-difference forming film and defines the thickness of the liquid crystal layer, and an alignment film which is subjected to a rubbing process in a predetermined direction, wherein the thickness of the liquid crystal layer corresponding to the reflective region is less than that of the liquid crystal layer corresponding to the transmissive region, and wherein a relative positional relationship between the spacer and the display pixel is defined such that a region of the alignment film, which is not subjected to the rubbing process due to existence of the spacer at the time of the rubbing process, is positioned in the display pixel corresponding to the colored region of the color from blue to green.

In this liquid crystal device, the liquid crystal layer is interposed between the first substrate and the second substrate, and the reflective region which reflects light incident from one surface of the first substrate, the transmissive region which transmits light incident from one surface of the second substrate to the one surface of the first substrate, and the display pixel corresponding to the colored region of a color from blue to green are included. That is, this liquid crystal device is a semi-transmissive reflective liquid crystal device having the display pixel corresponding to the colored region of the color from blue to green.

At least one of the first substrate and the second substrate has a step-difference forming film which is provided at the position corresponding to the reflective region and formed of a transparent material having an insulating property, such as acrylic resin, the spacer which is provided on the step-difference forming film and defines the thickness of the liquid crystal layer, and the alignment film which is subjected to a rubbing process in a predetermined direction. In this liquid crystal device, the thickness of the liquid crystal layer corresponding to the reflective region is less than that of the liquid crystal layer corresponding to the transmissive region to configure a multi-gap structure. In a suitable example, it is preferable that the spacer is formed by exposing and developing an organic insulating film made of acrylic resin or polyimide resin using a photolithography in a process of manufacturing the liquid crystal device. When the spacer has a cylindrical shaper the diameter thereof is about 10 to 20 μm and the thickness (height) thereof is about 3 to 6 μm.

Particularly, in this liquid crystal device, the relative positional relationship between the spacer and the display pixel is defined such that the domain region (alignment-defective region of the liquid crystal molecules) of the alignment film, which is not subjected to the rubbing process due to existence of the spacer at the time of the rubbing process, is positioned in the display pixel corresponding to the colored region of the color from blue to green, which hardly has influence on the vision of human. Accordingly, it is possible to allow the display of the alignment-defective region of the liquid crystal molecules to be inconspicuous at the time of driving the liquid crystal device and thus to prevent display quality from deteriorating due to the alignment-defective region of the liquid crystal molecules.

In a suitable example, it is preferable that the rubbing process is performed in a direction from the spacer to the display pixel corresponding to the colored region of the color from blue to green, based on the position of the spacer. It is preferable that the region, which is not subjected to the rubbing process, is positioned on an extension line of the direction of the rubbing process. It is preferable that the length of the region, which is not subjected to the rubbing process, in the direction of the rubbing process is greater than the thickness of the spacer and the width of the region, which is not subjected to the rubbing process, in a direction perpendicular to the direction of the rubbing process is equal to that of the spacer.

It is preferable that one of the first substrate and the second substrate is a color filter substrate including at least a colored layer including the colored region of the color from blue to green and a common electrode, and the other of the first substrate and the second substrate is an element substrate including a source line and a gate line which extend perpendicular to each other, a switching element which is provided in correspondence with an intersection between the gate line and the source line and is connected to the gate line and the source line, and a pixel electrode which is disposed at a position corresponding to the colored layer and is connected to the switching element, and the spacer is provided on the color filter substrate or the element substrate.

One of the first substrate and the second substrate is the color filter substrate including at least the colored layer including the colored region of the color from blue to green and the common electrode, and the other of the first substrate and the second substrate is the element substrate including the source line and the gate line which extend perpendicular to each other, the switching element which is provided in correspondence with an intersection between the gate line and the source line and is connected to the gate line and the source line, and the pixel electrode which is disposed at a position corresponding to the colored layer and is connected to the switching element. The spacer is provided on the color filter substrate or the element substrate.

It is preferable that, in a state that the element substrate and the color filter substrate face each other, the source line and the gate line for driving the display pixel corresponding to the colored region of the color from blue to green are disposed in the vicinity of the outer side of the pixel electrode corresponding to the display pixel, and the switching element connected to the source line and the gate line is disposed at a corner of the display pixel, and the spacer is disposed at a position which overlaps the gate line, the source line or the pixel electrode corresponding to the display pixel in a two-dimensional direction, a position which overlaps the intersection between the source line and the gate line in a two-dimensional direction, or a position which overlaps the switching element in a two-dimensional direction.

In the state that the element substrate and the color filter substrate face each other, the source line and the gate line for driving the display pixel corresponding to the colored region of the color from blue to green are disposed in the vicinity of the outer side of the pixel electrode corresponding to the display pixel and the switching element connected to the source line and the gate line is disposed at the corner of the display pixel.

Particularly, the spacer is disposed at the position which overlaps the gate line for driving the display pixel corresponding to the colored region of the color from blue to green, the source line for driving the display pixel corresponding to the colored region of the color from blue to green or the pixel electrode corresponding to the display pixel in a two-dimensional direction, the position which overlaps the intersection between the source line and the gate line for driving the display pixel in a two-dimensional direction, or the position which overlaps the switching element for driving the display pixel in a two-dimensional direction. Accordingly, the alignment-defective region of the liquid crystal molecules, which occurs due to the spacer, occurs in the display pixel corresponding to the colored region of the color from blue to green.

It is preferable that, in the display pixel corresponding to the colored region of the color from blue to green, a light shielding film having light shielding effect is provided at a position corresponding to the region which is not subjected to the rubbing process.

In the display pixel corresponding to the colored region of the color from blue to green, the light shielding film (black matrix) having light shielding effect is provided at a position corresponding to the region which is not subjected to the rubbing process, that is, the alignment-defective region of the liquid crystal molecules. Accordingly, since the alignment-defective region of the liquid crystal molecules is covered by the light shielding film at the time of driving the liquid crystal device, it is possible to prevent display quality from deteriorating.

It is preferable that, in the display pixel corresponding to the colored region of the color from blue to green, a light shielding film having light shielding effect is not provided at a position corresponding to the region which is not subjected to the rubbing process.

In the display pixel corresponding to the colored region of the color from blue to green, the light shielding film (black matrix) having light shielding effect is not provided at a position corresponding to the region which is not subjected to the rubbing process, that is, the alignment-defective region of the liquid crystal molecules. Accordingly, the alignment-defective region of the liquid crystal molecules is not covered by the light shielding film at the time of driving the liquid crystal device. However, since the alignment-defective region is disposed in the display pixel corresponding to the colored region of the color from blue to green, which hardly has influence on the vision of human, it is possible to allow the display of the alignment-defective region of the liquid crystal molecules to be inconspicuous and to prevent display quality from deteriorating. Since the light shielding film is not provided in the display pixel corresponding to the colored region of the color from blue to green, it is possible to prevent an aperture ratio of the display pixel from being reduced.

It is preferable that the color filter substrate includes four colored regions including a colored region of blue color series, a colored region of red color series, a colored region of a color from blue to green, and a colored region of a color from green to orange in the visible light region of which the color varies depending on the wavelength, and one color display pixel which is a minimum unit of color display has a structure in which display pixels corresponding to the four colored regions are arranged in a stripe shape or a mosaic shape.

The color filter substrate includes the four colored regions including the colored region of blue color series, the colored region of red color series, the colored region of a color from blue to green, and the colored region of a color from green to orange in the visible light region of which the color varies depending on the wavelength. One color display pixel which is the minimum unit of color display has the structure in which display pixels corresponding to the four colored regions are arranged in the stripe shape or the mosaic shape. Since the four colored region are used, it is possible to suppress the brightness of the light of green to orange having high human visibility from being reduced and to allow a color reproduction range (chromaticity range) to be greater than a case of using three colors of red, green and blue in a CIE chromaticity diagram.

In a suitable example, each of the display pixels corresponding to the four colored regions has a transmissive region for performing a transmissive display mode and a reflective region for performing a reflective display mode, the transmissive region transmits light from an illumination unit, and a reflective film having reflectivity is disposed at a position corresponding to the reflective region to reflect external light.

Each of the display pixels corresponding to the four colored regions has the transmissive region for performing a transmissive display mode and the reflective region for performing a reflective display mode. The illumination unit such as a backlight is disposed at a position corresponding to the transmissive region and the reflective film having reflectivity is disposed at the position corresponding to the reflective region. Accordingly, it is possible to configure a transmissive type liquid crystal device or a reflective type liquid crystal device having the display pixels corresponding to the four colored region.

It is preferable that each of the display pixels corresponding to the four colored regions has a transmissive region for performing a transmissive display mode and a reflective region for performing a reflective display mode, the optical concentrations of the four colored regions which are provided in correspondence with the reflective region are less than those of the four colored regions which are provided in correspondence with the transmissive region, and the spacer is provided in correspondence with the display pixel corresponding to the colored region of the color from blue to green in the reflective region.

Each of the display pixels corresponding to the four colored regions has the transmissive region for performing a transmissive display mode and the reflective region for performing a reflective display mode. Accordingly, it is possible to configure a semi-transmissive reflective type liquid crystal device. The optical concentrations of the four colored regions which are provided in correspondence with the reflective region are less than those of the four colored regions which are provided in correspondence with the transmissive region. Accordingly, it is possible to obtain adequate display properties in the transmissive display mode and the reflective display mode. Since the spacer is provided in correspondence with the display pixel corresponding to the colored region of the color from blue to green in the reflective region, it is possible to prevent display quality from deteriorating in the alignment-defective region of the liquid crystal molecules.

It is preferable that each of the display pixels corresponding to the four colored regions has a transmissive region for performing a transmissive display mode and a reflective region for performing a reflective display mode, the optical concentrations of the four colored regions which are provided in correspondence with the reflective region are equal to those of the four colored regions which are provided in correspondence with the transmissive region, a region in which the colored region is not provided in the reflective region is provided in at least one of the four colored regions corresponding to the reflective region, and the spacer is provided in correspondence with the display pixel corresponding to the colored region of the color from blue to green in the reflective region.

Each of the display pixels corresponding to the four colored regions has the transmissive region for performing a transmissive display mode and the reflective region for performing a reflective display mode. Accordingly, it is possible to configure a semi-transmissive reflective type liquid crystal device. The optical concentrations of the four colored regions which are provided in correspondence with the reflective region are equal to those of the four colored regions which are provided in correspondence with the transmissive region. The region in which the colored region is not provided in the reflective region (non-colored region) is provided in at least one of the four colored regions corresponding to the reflective region. Accordingly, it is possible to obtain adequate display properties in the transmissive display mode and the reflective display mode. Since the spacer is provided in correspondence with the display pixel corresponding to the colored region of the color from blue to green in the reflective region, it is possible to prevent display quality from deteriorating in the alignment-defective region of the liquid crystal molecules.

In a suitable example, it is preferable that the region which is not subjected to the rubbing process is positioned in a region in which the colored region of the color from blue to green is not provided in the reflective region (non-colored region). The non-colored region serves to increase the brightness of the display pixel corresponding to the colored region of the color from blue to green in the reflective region and to allow the display which occurs in the alignment-defective region of the liquid crystal molecules to be inconspicuous by improvement of the brightness of the non-colored region. Accordingly, it is possible to prevent display quality from deteriorating due to the alignment-defective region of the liquid crystal molecules which occurs due to the spacer.

It is preferable that each of the display pixels corresponding to three colored regions including the colored region of blue color series, the colored region of red color series and the colored region of the color from green to orange has a transmissive region for performing a transmissive display mode and a reflective region for performing a reflective display mode, the display pixel corresponding to the colored region of the color from blue to green has only a transmissive region, a region in which the colored region is not provided in the reflective region (non-colored region) is provided in at least one of the three colored regions corresponding to the reflective region, and the spacer is provided in correspondence with the display pixel corresponding to the colored region of the color from blue to green in the transmissive region.

Each of the display pixels corresponding to three colored regions has the transmissive region for performing a transmissive display mode and the reflective region for performing a reflective display mode and the display pixel corresponding to the colored region of the color from blue to green has only the transmissive region. The region in which the colored region is not provided in the reflective region (non-colored region) is provided in at least one of the three colored regions corresponding to the reflective region. Accordingly, it is possible to obtain adequate display properties in the transmissive display mode and the reflective display mode. Since the spacer is provided in correspondence with the display pixel corresponding to the colored region of the color from blue to green in the transmissive region, it is possible to prevent display quality from deteriorating in the alignment-defective region of the liquid crystal molecules.

It is preferable that each of the display pixels corresponding to three colored regions including the colored region of blue color series, the colored region of red color series and the colored region of the color from green to orange has a transmissive region for performing a transmissive display mode and a reflective region for performing a reflective display mode, the display pixel corresponding to the colored region of the color from blue to green has only a transmissive region, the area of the display pixel corresponding to the colored region of the color from blue to green is less than that of each of the display pixels corresponding to the three colored regions, and the spacer is provided in correspondence with the display pixel corresponding to the colored region of the color from blue to green in the transmissive region.

Each of the display pixels corresponding to three colored regions has the transmissive region for performing a transmissive display mode and the reflective region for performing a reflective display mode and the display pixel corresponding to the colored region of the color from blue to green has only a transmissive region. The area of the display pixel corresponding to the colored region of the color from blue to green is less than that of each of the display pixels corresponding to the three colored regions. Since the display pixel corresponding to the colored region of the color from blue to green is subsidiarily used when a color reproduction range need be improved, display quality is hardly influenced by this configuration.

Particularly, since the spacer is provided in correspondence with the display pixel corresponding to the colored region of the color from blue to green in the transmissive region, it is possible to prevent display quality from deteriorating in the alignment-defective region of the liquid crystal molecules.

It is preferable that each of the display pixels corresponding to the four colored regions has a transmissive region for performing a transmissive display mode and a reflective region for performing a reflective display mode, and the colored region of the color from blue to green is not provided in the reflective region of the display pixel corresponding to the colored region of the color from blue to green or the colored region of the color from blue to green is provided in the reflective region of the display pixel corresponding to the colored region of the color from blue to green and the area of the colored region of the color from blue to green is less than those of the colored region of blue color series, the colored region of red color series and the colored region of the color from green to orange corresponding to the reflective region, a region in which the colored region is not provided in the reflective region (non-colored region) is provided in at least one of the four colored regions corresponding to the reflective region, and the spacer is provided in correspondence with the display pixel corresponding to the colored region of the color from blue to green in the reflective region.

Each of the display pixels corresponding to the four colored regions has the transmissive region for performing a transmissive display mode and the reflective region for performing a reflective display mode. The colored region of the color from blue to green is not provided in the reflective region of the display pixel corresponding to the colored region of the color from blue to green. That is, the reflective region corresponding to the colored region of the color from blue to green is the non-colored region. Accordingly, it is possible to improve the brightness of the light in this region. Alternatively, the colored region of the color from blue to green is provided in the reflective region of the display pixel corresponding to the colored region of the color from blue to green and the area of the colored region of the color from blue to green is less than those of the other three colored regions corresponding to the reflective region. Since the display pixel corresponding to the colored region of the color from blue to green is subsidiarily used when a color reproduction range need be improved, display quality is hardly influenced by this configuration. The region in which the colored region is not provided in the reflective region (non-colored region) is provided in at least one of the four colored regions corresponding to the reflective region. Particularly, since the spacer is provided in correspondence with the display pixel corresponding to the colored region of the color from blue to green in the reflective region, it is possible to prevent display quality from deteriorating in the alignment-defective region of the liquid crystal molecules.

In a suitable example, it is preferable that the region which is not subjected to the rubbing process is positioned in a region in which the colored region of the color from blue to green is not provided in the reflective region (non-colored region).

The non-colored region serves to increase the brightness of the display pixel corresponding to the colored region of the color from blue to green in the reflective region and to allow the display which occurs in the alignment-defective region of the liquid crystal molecules to be inconspicuous by improvement of the brightness of the non-colored region. Accordingly, it is possible to prevent display quality from deteriorating due to the alignment-defective region of the liquid crystal molecules which occurs due to the spacer.

According to another aspect of the invention, there is provided a liquid crystal device, wherein a liquid crystal layer is interposed between a first substrate and a second substrate and at least a display pixel of cyan is included, wherein at least one of the first substrate and the second substrate has a spacer which defines the thickness of the liquid crystal layer and an alignment film which is subjected to a rubbing process in a predetermined direction, and wherein a relative positional relationship between the spacer and the display pixel is defined such that a region of the alignment film, which is not subjected to the rubbing process due to existence of the spacer at the time of the rubbing process, is positioned in the display pixel of cyan. The relative positional relationship between the spacer and the display pixel is defined such that the domain region (alignment-defective region of the liquid crystal molecules) of the alignment film, which is not subjected to the rubbing process due to existence of the spacer at the time of the rubbing process, is positioned in the display pixel corresponding to the colored region of the color from blue to green, which hardly has influence on the vision of human. Accordingly, it is possible to allow the display of the alignment-defective region of the liquid crystal molecules to be inconspicuous at the time of driving the liquid crystal device and thus to prevent display quality from deteriorating due to the alignment-defective region of the liquid crystal molecules.

According to another aspect of the invention, there is provided a liquid crystal device, wherein a liquid crystal layer is interposed between a first substrate and a second substrate and a reflective region which reflects light incident from one surface of the first substrate, a transmissive region which transmits light incident from one surface of the second substrate to the one surface of the first substrate, and at least a display pixel of cyan are included, wherein at least one of the first substrate and the second substrate has a step-difference forming film which is provided at a position corresponding to the reflective region, a spacer which is provided on the step-difference forming film and defines the thickness of the liquid crystal layer, and an alignment film which is subjected to a rubbing process in a predetermined direction, wherein the thickness of the liquid crystal layer corresponding to the reflective region is less than that of the liquid crystal layer corresponding to the transmissive region, and wherein a relative positional relationship between the spacer and the display pixel is defined such that a region of the alignment film, which is not subjected to the rubbing process due to existence of the spacer at the time of the rubbing process, is positioned in the display pixel corresponding to the colored region of cyan. The relative positional relationship between the spacer and the display pixel is defined such that the domain region (alignment-defective region of the liquid crystal molecules) of the alignment film, which is not subjected to the rubbing process due to existence of the spacer at the time of the rubbing process, is positioned in the display pixel corresponding to the colored region of the color from blue to green, which hardly has influence on the vision of human. Accordingly, it is possible to allow the display of the alignment-defective region of the liquid crystal molecules to be inconspicuous at the time of driving the liquid crystal device and thus to prevent display quality from deteriorating due to the alignment-defective region of the liquid crystal molecules.

According to another aspect of the invention, there is provided a liquid crystal device, wherein a liquid crystal layer is interposed between a first substrate and a second substrate and at least a display pixel including a colored region having a wavelength peak of 485 to 535 nm of transmitted light is included, wherein at least one of the first substrate and the second substrate has a spacer which defines the thickness of the liquid crystal layer and an alignment film which is subjected to a rubbing process in a predetermined direction, and wherein a relative positional relationship between the spacer and the display pixel is defined such that a region of the alignment film, which is not subjected to the rubbing process due to existence of the spacer at the time of the rubbing process, is positioned in the display pixel including the colored region having the wavelength peak of 485 to 535 nm of the transmitted light. The relative positional relationship between the spacer and the display pixel is defined such that the domain region (alignment-defective region of the liquid crystal molecules) of the alignment film, which is not subjected to the rubbing process due to existence of the spacer at the time of the rubbing process, is positioned in the display pixel including the colored region having the wavelength peak of 485 to 535 nm of the transmitted light, which hardly has influence on the vision of human. Accordingly, it is possible to allow the display of the alignment-defective region of the liquid crystal molecules to be inconspicuous at the time of driving the liquid crystal device and thus to prevent display quality from deteriorating due to the alignment-defective region of the liquid crystal molecules.

According to another aspect of the invention, there is provided a liquid crystal device, wherein a liquid crystal layer is interposed between a first substrate and a second substrate and a reflective region which reflects light incident from one surface of the first substrate, a transmissive region which transmits light incident from one surface of the second substrate to the one surface of the first substrate, and at least a display pixel including a colored region having a wavelength peak of 485 to 535 nm of transmitted light are included, wherein at least one of the first substrate and the second substrate has a step difference forming film which is provided at a position corresponding to the reflective region, a spacer which is provided on the step-difference forming film and defines the thickness of the liquid crystal layer, and an alignment film which is subjected to a rubbing process in a predetermined direction, wherein the thickness of the liquid crystal layer corresponding to the reflective region is less than that of the liquid crystal layer corresponding to the transmissive region, and wherein a relative positional relationship between the spacer and the display pixel is defined such that a region of the alignment film, which is not subjected to the rubbing process due to existence of the spacer at the time of the rubbing process, is positioned in the display pixel including the colored region having the wavelength peak of 485 to 535 nm of the transmitted light. The relative positional relationship between the spacer and the display pixel is defined such that the domain region (alignment-defective region of the liquid crystal molecules) of the alignment film, which is not subjected to the rubbing process due to existence of the spacer at the time of the rubbing process, is positioned in the display pixel including the colored region having the wavelength peak of 485 to 535 nm of the transmitted light, which hardly has influence on the vision of human. Accordingly, it is possible to allow the display of the alignment-defective region of the liquid crystal molecules to be inconspicuous at the time of driving the liquid crystal device and thus to prevent display quality from deteriorating due to the alignment-defective region of the liquid crystal molecules.

According to another aspect of the invention, there is provided a liquid crystal device, wherein a liquid crystal layer is interposed between a first substrate and a second substrate, and a plurality of display pixels corresponding to red, blue and green and a display pixel corresponding to a complementary color of any one of red, blue and green, wherein at least one of the first substrate and the second substrate has a spacer which defines the thickness of the liquid crystal layer and an alignment film which is subjected to a rubbing process in a predetermined direction, and wherein a relative positional relationship between the spacer and the display pixel is defined such that a region of the alignment film, which is not subjected to the rubbing process due to existence of the spacer at the time of the rubbing process, is positioned in the display pixel of the complementary color.

In this liquid crystal device, the liquid crystal layer is interposed between the first substrate and the second substrate, and the plurality of display pixels corresponding to red, blue and green and the display pixel corresponding to the complementary color of any one of red, blue and green. At least one of the first substrate and the second substrate has the spacer which defines the thickness of the liquid crystal layer and the alignment film which is subjected to a rubbing process in the predetermined direction. In a suitable example, it is preferable that the spacer is formed by exposing and developing an organic insulating film made of acrylic resin or polyimide resin using a photolithography in a process of manufacturing the liquid crystal device. When the spacer has a cylindrical shape, the diameter thereof is about 10 to 20 μm and the thickness (height) thereof is about 3 to 6 μm.

Particularly, in this liquid crystal device, the relative positional relationship between the spacer and the display pixel is defined such that the domain region (alignment-defective region of the liquid crystal molecules) of the alignment film, which is not subjected to the rubbing process due to existence of the spacer at the time of the rubbing process, is positioned in the display pixel of the complementary color, which hardly has influence on the vision of human. Accordingly, it is possible to allow the display of the alignment-defective region of the liquid crystal molecules to be inconspicuous at the time of driving the liquid crystal device and thus to prevent display quality from deteriorating due to the alignment-defective region of the liquid crystal molecules.

According to another aspect of the invention, there is provided an electronic apparatus comprising the aforementioned liquid crystal device as a display unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings. The following embodiments are to apply the invention to a liquid crystal device.

The invention defines a relative positional relationship between a photospacer and a display pixel of cyan such that a domain region (alignment-defective region of liquid crystal molecules) of an alignment film, which is not subjected to a rubbing process due to existence of the photospacer at the time of the rubbing process in a process of manufacturing the liquid crystal device is positioned in a sub pixel of cyan, which hardly has influence on vision of human. Accordingly, it is possible to allow the display of the alignment-defective region of the liquid crystal molecules to be inconspicuous at the time of driving the liquid crystal device and thus to prevent display quality from deteriorating due to the alignment-defective region of the liquid crystal molecules.

First Embodiment

A first embodiment is to apply the invention to a transmissive type liquid crystal device having four colors of red (R), blue (B), green (G) and cyan (C).

Configuration of Liquid Crystal Device

First, a configuration of a liquid crystal device 100 according to the first embodiment of the invention will be described with reference to FIGS. 1 and 2.

Figure 1:
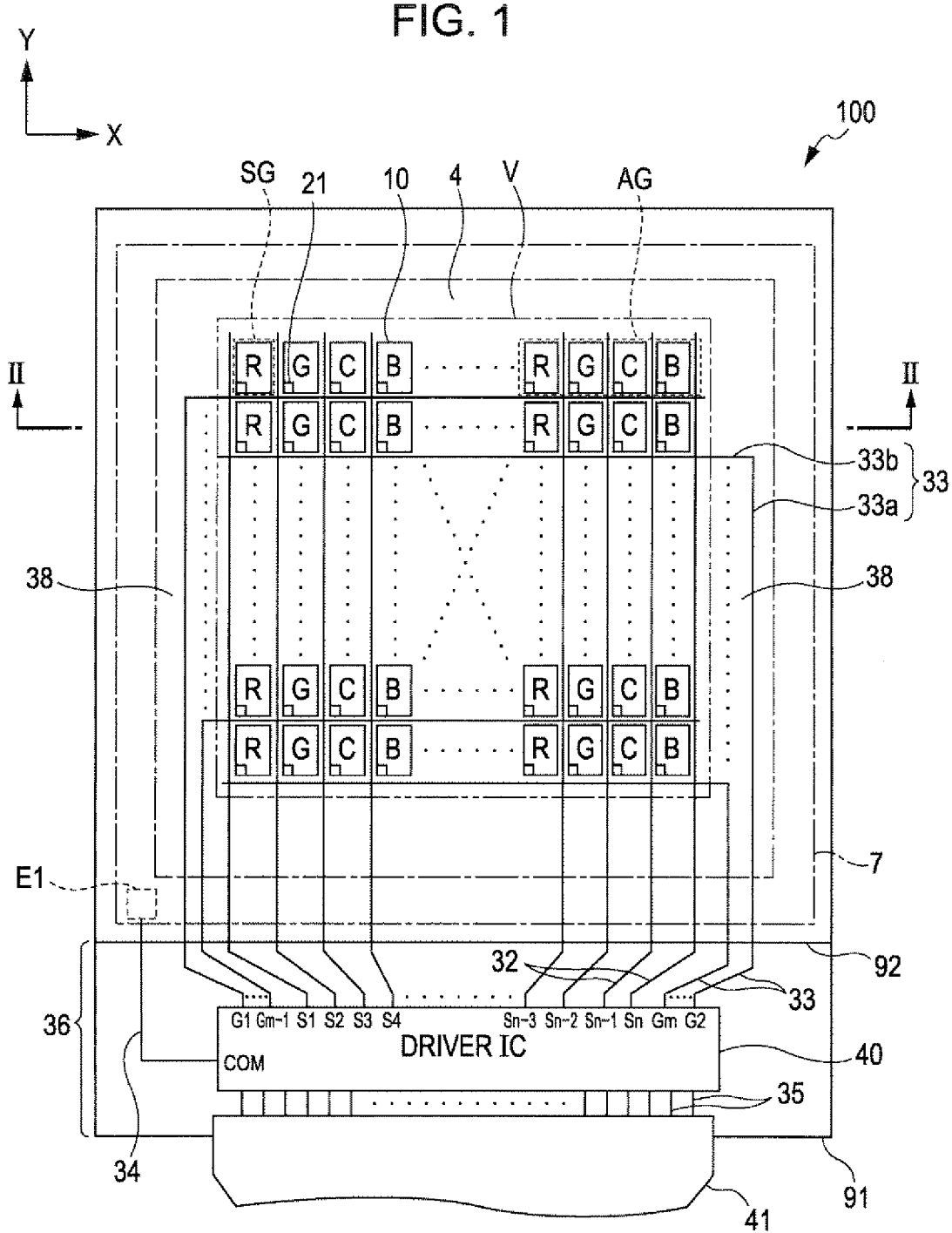
FIG. 1 is a plan view schematically showing a configuration of a liquid crystal device according to a first embodiment of the invention.

FIG. 1 is a plan view schematically showing the configuration of the liquid crystal device 100 according to the first embodiment of the invention. In FIG. 1, a color filter substrate 92 is disposed at the front side (viewing side) of Figure as a first substrate and an element substrate 91 is disposed at the back side of Figure as a second substrate. In FIG. 1, a vertical direction (column direction) of Figure is a Y direction and a horizontal direction (row direction) of Figure is an X direction. In FIG. 1, a region corresponding to each color of R, G, B, or C represents one sub pixel region SG and a 1×4 pixel array corresponding to R, G, B and C represents one pixel region AG. Hereinafter, one display region which exists in one sub pixel region SG is referred to as "sub pixel" and a plurality of display regions which exists in one pixel region AG is referred to as "one pixel".

In the liquid crystal device 100, the element substrate 91 and the color filter substrate 92 which faces the element substrate 91 are adhered to each other through a frame-shaped seal material 7 and twisted nematic type liquid crystal is filled in the seal material 7 to form a liquid crystal layer 4.

The liquid crystal device 100 is a color display liquid crystal device using four colors of R, G, B and C and an active matrix driving type liquid crystal device using an a-Si type thin film transistor (TFT) element as a switching element. The liquid crystal device 100 is a transmissive type liquid crystal device.

First, a planar configuration of the element substrate 91 will be described. On the inner surface of the element substrate 91, a plurality of source lines 32, a plurality of gate liens 33, a plurality of a-Si type TFT elements 21, a plurality of pixel electrodes 10, a driver IC 40, external connection wires 35 and a flexible printed circuit (FPC) 41 are formed or mounted.

As shown in FIG. 1, the element substrate 91 has an extension region 36 which extends from one side of the color filter substrate 92 outwardly and the driver IC 40 is mounted on the extension region 36. Input terminals (not shown) of the driver IC 40 are electrically connected to one ends of the plurality of external connection wires 35 and the other ends of the plurality of external connection wires 35 are electrically connected to the FPC. The source lines 32 extend in the Y direction and are formed at a predetermined interval in the X direction and one ends of the source lines 32 are electrically connected to output terminals (not shown) of the driver IC 40.

The gate lines 33 include first wires 33a which extend in the Y direction and second wires 33b which extend from terminations of the first wires 33a in the X direction and extend in the below-described valid display region V. The second wires 33b of the gate lines 33 extend in a direction perpendicular to the source lines 32, that is, the X direction, and are formed at a predetermined interval in the Y direction. One ends of the first wires 33a of the gate lines 33 are electrically connected to the output terminal (not shown) of the driver IC 40. In the vicinities of the intersections between the source lines 32 and the second wires 33b of the gate lines 33, the TFT elements 21 are provided. The TFT elements 21 are electrically connected to the source lines 32, the gate lines 33 and the pixel electrodes 10. The TFT elements 21 and the pixel electrodes 10 are provided at positions corresponding to the sub pixel regions SG. The pixel electrodes 10 are formed of a transparent conductive material such as indium tin oxide (ITO).

A region in which a plurality of pixel regions AG is arranged in a matrix in the X direction and the Y direction is the valid display region V (region surrounded by a two-dot chain line). In the valid display region V, an image such as a character, a numeral or a figure is displayed. An external region of the valid display region V is a frame region 38 which does not contribute to display. An alignment film 17 (see FIG. 2) is formed on the inner surfaces of the source lines 32, the gate lines 33, the TFT elements 21 and the pixel electrodes 10.

Next, the planar configuration of the color filter substrate 92 will be described. The color filter substrate 92 has a light shielding layer (generally, referred to as "black matrix" and, hereinafter, abbreviated to "BM"), four colored layers 6R, 6G, 6B and 6C of R, G, B and C, and a common electrode 8. In the following description, when the colored layer is represented regardless of color, the colored layer is represented by "colored layer 6" and, when the colored layer is represented with regard to color, the colored layer is represented by "colored layer 6R" or the like. The BMs are formed at positions for partitioning the sub pixel regions SG. The common electrode 8 is formed of a transparent conductive material such as ITO, similar to the pixel electrode and is formed over substantial one surface of the color filter substrate 92. The common electrode 8 is electrically connected to one end of a wire 34 in a region E1 positioned at a corner of the seal material 7 and the other end of the wire 34 is electrically connected to an output terminal (ground terminal) COM of the driver IC 40.

In the liquid crystal device 100 having such a configuration, based on a signal and power from the FPC 41 connected to an electronic apparatus, the gate lines 33 are exclusively and sequentially selected one by one by the driver IC 40 in the order of G1, G2, . . . , Gm−1 and Gm (m is an integer) and a gate signal having a selection voltage is supplied to the selected gate line 33 and a gate signal having a non-selection voltage is supplied to the other non-selected gate lines 33. The driver IC 40 supplies a source signal according to display contents to the pixel electrode 10 positioned at a position corresponding to the selected gate line 33 through the source lines 32 corresponding to S1, S2, . . . , Sn−1 and Sn (n is an integer) and the TFT elements 21. As a result, the display state of the liquid crystal layer 4 is converted to a non-display state or an intermediate display state and the alignment state of the liquid crystal molecules in the liquid crystal layer 4 is controlled.

Next, the cross-sectional configuration of the liquid crystal device 100 will be described with reference to FIG. 2. FIG. 2 is a cross-sectional view taken along line II-II of FIG. 1, and more particularly, a cross-sectional view cut in a position which passes through the colored layers of R, G, C and B.

A lower substrate 1 is formed of an insulating material such as glass or quartz. On the inner surface of the lower substrate 1, the pixel electrode 10 is formed in each sub pixel region SG. The source lines 32 are formed on the inner surface of the lower substrate 1 in the vicinities of the left edges of the pixel electrodes 10. The pixel electrodes 10 are electrically connected to the source lines 32 corresponding thereto through the TFT elements 21 (see FIG. 1). On the inner surfaces of the lower substrate 1, the pixel electrodes 10, the TFT elements 21 and the source lines 32, the alignment film 17 composed of a polyimide film is formed and the surface of the alignment film 17 is subjected to a rubbing process in a predetermined direction. A polarization plate 11 is disposed on the outer surface of the lower substrate 1 and a backlight 15 is disposed on the outer surface of the polarization plate 11 as an illumination unit. The backlight 15 may be, for example, a dot light source such as a light emitting diode (LED) or a combination of a linear light source such as a cold cathode fluorescent tube and a light guide plate.

on the inner surface of an upper substrate 2, the colored layer 6 composed of any one of four colors of R, G, B and C is provided in each sub pixel region SG in a stripe shape in the arrangement order of R, G, C, B, R, G, C, B, .... The colored layers 6R, 6G, 6C and 6B face the pixel electrodes 10 corresponding thereto. The BMs are formed on the inner surface of the upper substrate 2 at positions for partitioning the colored layers 6 to separate adjacent sub pixel regions SG from each other such that light is prevented from being mixed from one sub pixel region SG to the other sub pixel region SG. On the inner surfaces of the color filters 6 and the BMs, an overcoat layer 19 made of acrylic resin is formed. The overcoat layer 19 serves to protect the colored layers 6 from corrosion or contamination due to an agent used during a process of manufacturing the liquid crystal device 100. On the inner surface of the overcoat layer 19, the common electrode 8 made of ITO is formed. Photospacers 22 (see FIG. 3) are provided on the common electrode 18 at predetermined positions. The photospacer 22 may be generally called a columnar spacer, a scallop-like spacers or a rib. An alignment film 20 composed of a polyimide film is formed on the inner surfaces of the common electrode 8 and the photospacers 22, and the surface of the alignment film 20 is subjected to a rubbing process in a predetermined direction. A polarization plate 12 is disposed on the outer surface of the upper substrate 2. The lower substrate 1 and the upper substrate 2 face each other through the seal material 7 and liquid crystal is filled between the both substrates to form the liquid crystal layer 4. In the liquid crystal device 100, as described below, the liquid crystal layer 4 is defined to a uniform thickness by the photospacers 22.

Figure 2:
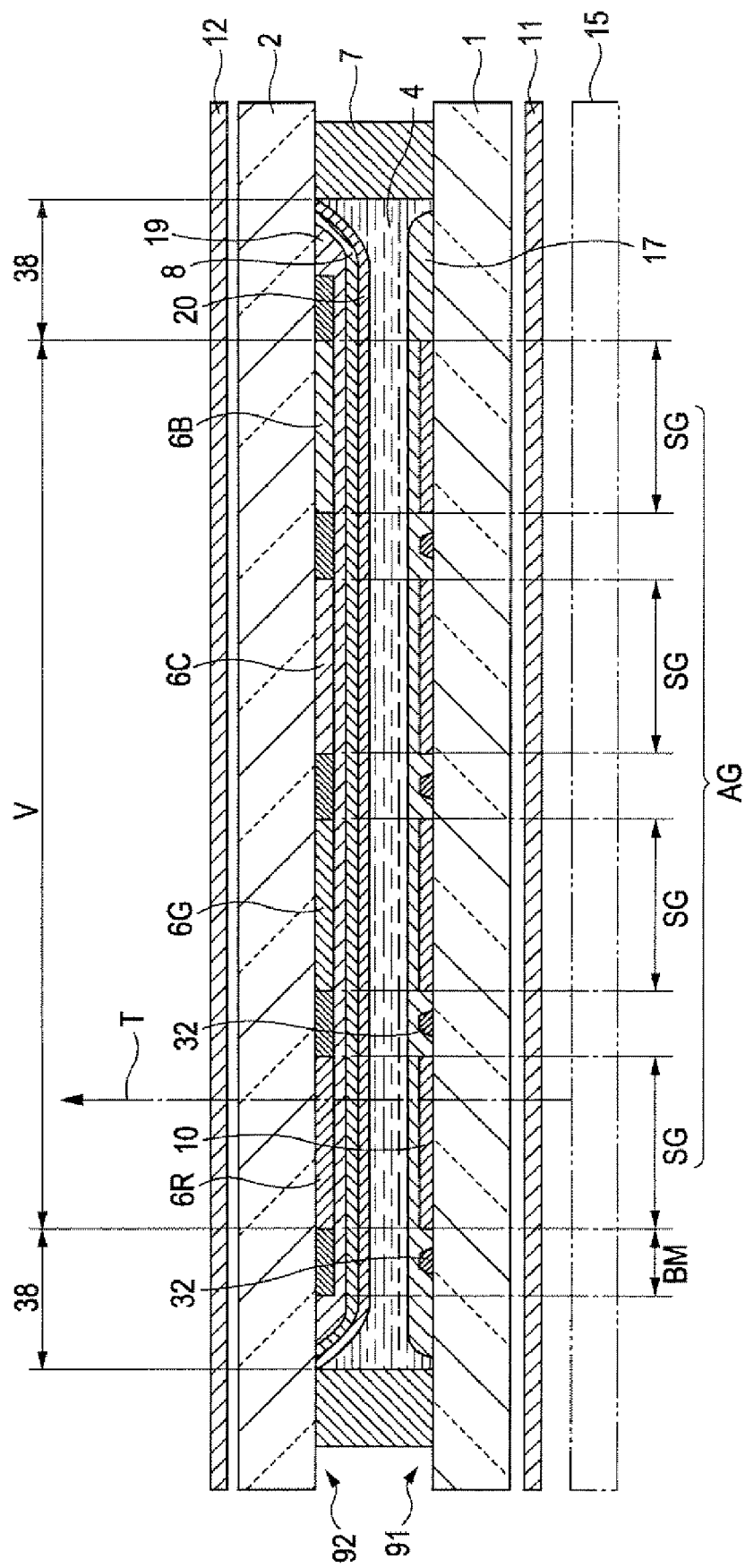
FIG. 2 is a cross-sectional view taken along line II-II of FIG. 1.

When the transmissive display mode is performed in the liquid crystal device 100 having the above-described configuration, illumination light emitted from the backlight 15 advances along a path T shown in FIG. 2 and reaches the viewer through the pixel electrodes 10 and the colored layers 6 of R, G, C and B. In this case, the illumination light has predetermined color and brightness by passing through the colored layers 6. Accordingly, the viewer can view a desired color display image. Particularly, since the liquid crystal device 100 uses four colors of R, G, C and B, the brightness of the light of G having high human visibility is suppressed from being reduced and, in a CIE chromaticity diagram, a color reproduction range (chromaticity range) is greater than that of a liquid crystal device using three colors of R, G and B.

Arrangement Structure of Photospacer

Figure 3:
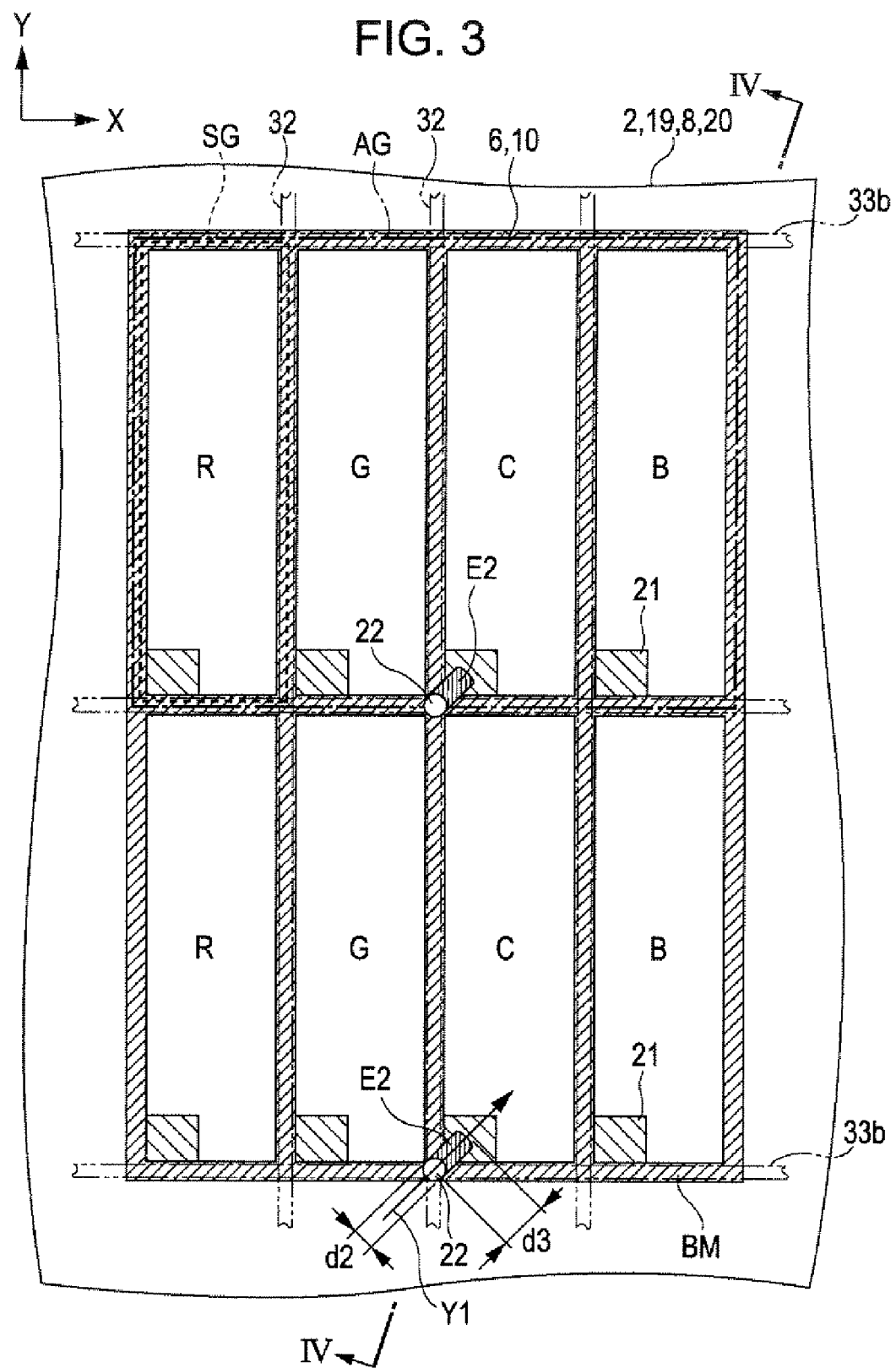
FIG. 3 is a plan view showing a pixel configuration and an alignment structure of a photospacer according to the first embodiment of the invention.
Figure 4:
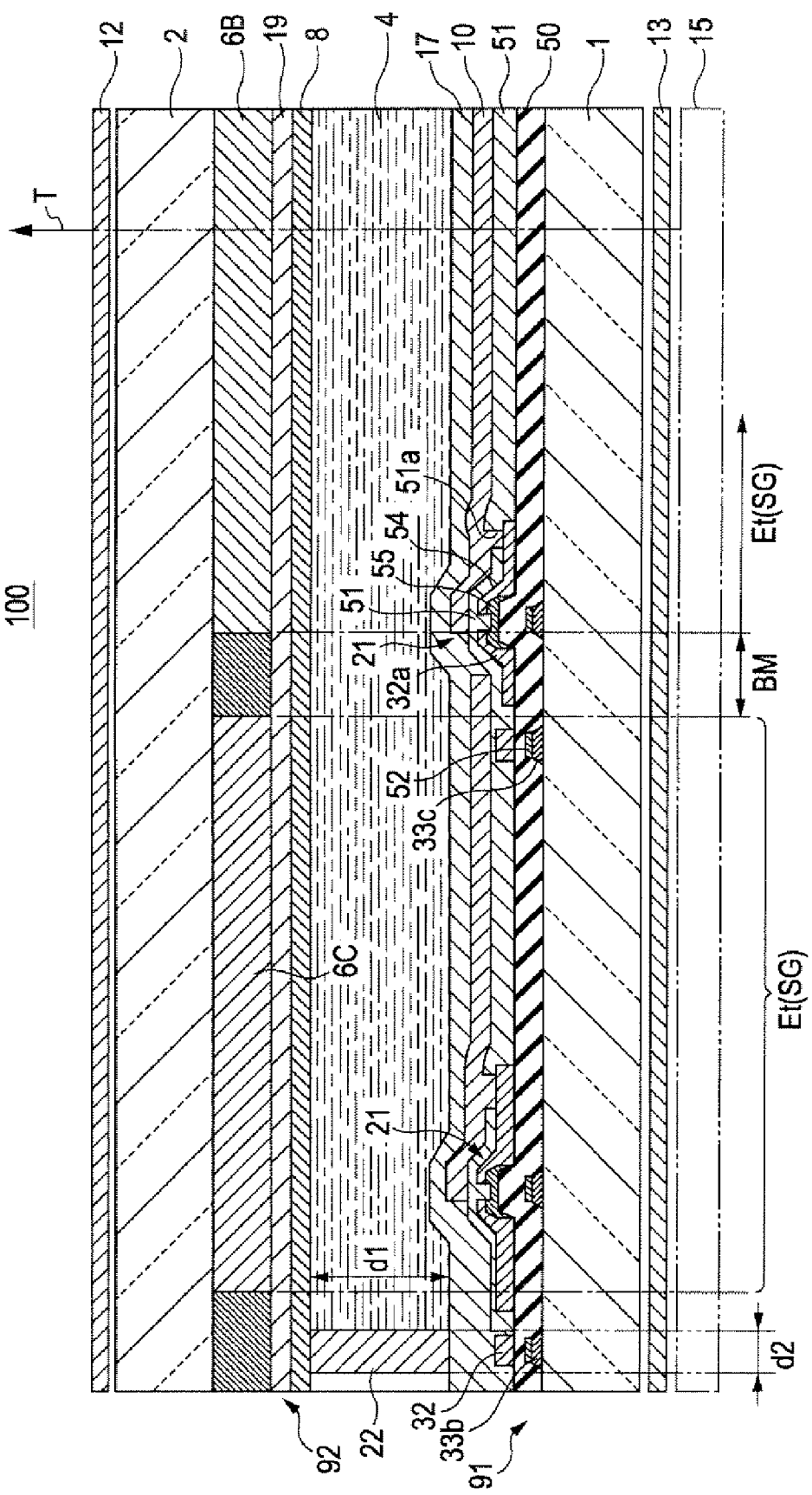
FIG. 4 is a partial cross-sectional view taken along line IV-IV of FIG. 3.

Next, the arrangement structure of the photospacer according to the first embodiment of the invention will be described with reference to FIGS. 3 and 4. FIG. 3 is a partial plan view showing a planar layout corresponding to two pixels in the color filter substrate 92 according to the first embodiment. In FIG. 3, in order to facilitate understanding of a relative positional relationship between the components of the color filter substrate 92 and the components of the element substrate 92, the pixel electrodes 10, the TFT elements 21, the source lines 32 and the second wires 33b of the gate lines 33, which are provided at the element substrate 91, are also shown.

First, the planar configuration of the color filter substrate 92 will be described.

On the upper substrate 2, the colored layer 6 made of any one of R, G, C and B is provided in each sub pixel region SG. The colored layer 6 is arranged in the stripe shape in the arrangement order of 6R, 6G, 6C and 6B in the X direction, for each pixel region AG. The four colored layers 6R, 6G, 6C and 6B configure one color pixel which is a minimum unit of color display. The BMs are disposed at positions for partitioning the colored layers 6. The overcoat layer 19 is provided on the colored layers 6 and the BMs and the common electrode 8 is provided on the overcoat layer 19 over the entire surface. The photospacer 22 having a cylindrical shape is formed on the common electrode 8 at a position adjacent to the left lower corner of the colored layer 6C. The photospacer 22 may be formed at a desired position with a desired shape by coating the common electrode 8 with an organic insulating layer made of acrylic resin or polyimide resin and exposing and developing the film using a photolithography in a process of manufacturing the liquid crystal device 100.

When the photospacer 22 has the cylindrical shape, it is preferable that the diameter $d2$ thereof is set to about 10 to 20 μm and the height $d1$ thereof (see FIG. 4) is set to about 3 to 6 μm. The relative positional relationship between the photospacer 22 and the primary component of the element substrate 91 will be described later. Although the alignment film 20, which is subjected to the rubbing process in a direction denoted by an arrow Y1 (hereinafter, referred to as "rubbing direction Y1"), is provided on the common electrode 8 and the surface of the photospacer 22, the alignment film 20 is not shown in FIG. 4. The rubbing direction Y1 is a direction from the photospacer 22 to the sub pixel corresponding to the colored layer 6C of cyan (C), based on the position of the photospacer 22. In an example, it is preferable that the rubbing direction Y1 is, for example, set to about 45 degrees from the X direction in a counterclockwise direction. The rubbing method may employ a variety of known methods.

Subsequently, the planar positional relationship between the primary components of the color filter substrate 92 and the primary components of the element substrate 91 will be described.

In the element substrate 91, the pixel electrodes 10 are disposed at the positions corresponding to the colored layers 6. In the element substrate 92, the source lines 32 extend in the Y direction between the colored layers which are adjacent to each other in the X direction. Thus, the source lines 32 overlap the BMs in a two-dimensional direction. In the element substrate 91, the second wires 33b of the gate lines 33 extend in the X direction between the colored layers 6 which are adjacent to each other in the Y direction. Thus, the second wires 33b of the gate lines 33 overlap the BMs in a two-dimensional direction. In the element substrate 91, the TFT elements 21 (region surrounded by a dotted line) are provided at positions corresponding to the left lower corners of the colored layers 6 and the BMs are not formed at the positions corresponding to the TFT elements 21. The photospacer 22 is provided on the color filter substrate 92 at a position adjacent to the left lower corner of the pixel electrode 10 corresponding to each colored layer 6C of cyan (C), a position corresponding to an intersection between the source line 32 and the second wire 33b of the gate line 33, and a position corresponding to the BM.

Next, the cross-sectional configuration of the liquid crystal device 100 including the photospacer 22 will be described with reference to FIG. 4. FIG. 4 is a cross-sectional view taken along line IV-IV of FIG. 3, and more particularly, is a cross-sectional view corresponding to about two pixels cut in a position which passes through the photospacer 22. In FIG. 4, for convenience sake, the alignment film 20 is not shown. Hereinafter, the above-described components are denoted by the same reference numerals and their detailed description will be simplified or omitted.

First, the cross-sectional configuration of the element 91 corresponding to about two pixels will be described.

A gate electrode 33c connected to the second wire 33b of the gate line 33 is formed on the inner surface of the lower substrate 1 at a corner of the sub pixel region SG. A conductive layer 52 made of molybdenum is formed on the inner surface of the gate electrode 33c. A gate insulating film 50 having an insulating property is formed on the inner surfaces of the lower substrate 1 and the conductive layer 52. An α-Si layer 55 is provided on the inner surface of the gate insulating film 50 at a position which overlaps the gate electrode 33c. On the inner surface of the gate insulating film 50, a source electrode 32a connected to the source line 32 is provided in the vicinity of the left edge of the α-Si layer 55 and a drain electrode 54 is provided in the vicinity of the right edge of the α-Si layer 55. The source electrode 32a and the drain electrode 54 partially overlap the α-Si layer 55. A passivation layer (reaction preventing layer) 51 having an insulating property is formed on the inner surfaces of the gate insulating film 50, the source electrode 32a, the drain electrode 54 and the α-Si layer 55. The passivation layer 51 has an opening 51a at a position corresponding to one end of the drain electrode 54 which is a component of the TFT element 21. The TFT element 21 is configured by this lamination structure. In the invention, the TFT element 21 is not limited to the above-described configuration. The pixel electrode 10 made of ITO is formed on the inner surface of the passivation layer 51, for each sub pixel region SG. A portion of the pixel electrode 10 is formed in the opening 51a of the passivation layer 51 and electrically connected to one end of the drain electrode 54. Thus, the pixel electrode 10 is electrically connected to the TFT element 21. The alignment film 17 which is subjected to the rubbing process in the predetermined direction is formed on the inner surface of the pixel electrode 10 or the like.

Next, the cross-sectional configuration of the color filter substrate 92 corresponding to about two pixels will be described.

On the inner surface of the upper substrate 2, the colored layer 6C corresponding to cyan (C) is formed in one sub pixel region SG and the colored layer 6B corresponding to blue (B) is formed in another sub pixel region SG adjacent to the one sub pixel region SG. The BM is formed at a position for partitioning the colored layers 6C and 6B. The overcoat layer 19 is formed on the inner surfaces of the colored layer 6C, the colored layer 6B and the BM. The common electrode 8 made of ITO is formed on the inner surface of the overcoat layer 19 and the photospacer 22 is provided on the inner surface of the common electrode 8 at the position corresponding to the intersection between the source line 32 and the second wire 33b of the gate line 33 for driving the pixel electrode 10 corresponding to the colored layer 6C and the position corresponding to the BM. Although the alignment film 20, which is subjected to the rubbing process in the direction denoted by the arrow Y1 of FIG. 3, is formed on the inner surfaces of the common electrode 8 and the photospacer 22, the alignment film 20 is not shown in FIG. 4.

The liquid crystal is filled between the element substrate 91 and the color filter substrate 92 having the above-described configuration to form the liquid crystal layer 4 and the thickness of the liquid crystal layer 4 is set to a uniform thickness d1 by the photospacer 22 provided at the above-described position.

Next, the effect of the first embodiment of the invention will be described with reference to FIG. 3.

First, prior to the effect, the manufacturing process of the first embodiment will be described. In the manufacturing process of the first embodiment, the photospacer 22 is formed on the common electrode 8 of the color filter substrate 92 using a known method, at the position adjacent to the left lower corner of the colored layer 6C of cyan (C), the position corresponding to intersection between the source line 32 and the second wire 33b of the gate line 33, and the position which overlaps the BM. Subsequently, in the manufacturing process, the alignment film 20 is formed on the inner surfaces of the common electrode 8 and the photospacer 22 and the surface of the alignment film 20 is rubbed in the direction denoted by the arrow Y1. Accordingly, the rubbing process which serves to align the liquid crystal molecules on the surface of the alignment film 20 in the predetermined direction is performed. At this time, a region E2 which is shaded by the photospacer 22 in the direction denoted by arrow Y1, which is a movement direction of a rubbing cloth, is not rubbed due to the existence of the photospacer 22 on the alignment film 20 corresponding to the sub pixel of cyan (C). Thus, the region E2 becomes a region in which the liquid crystal molecules cannot be aligned in the predetermined direction, that is, an alignment-defective region (domain region) of the liquid crystal molecules.

Hereinafter, the region E2 is also referred to as "alignment-defective region E2 of the liquid crystal molecules". Here, the alignment-defective region E2 of the liquid crystal molecules, as shown in FIG. 3, occurs on an extension line of the rubbing direction Y1. The width of the alignment-defective region E2 of the liquid crystal molecules is substantially equal to the diameter d2 of the photospacer 22 and the length thereof is about three times the height d1 of the photospacer 22. Accordingly, for example, when the diameter d2 of the photospacer 22 is set to about 10 to 20 μm and the height d1 thereof is set to 3 to 6 μm, the alignment-defective region E2 of the liquid crystal molecules has a width of about 10 to 20 μm, which is substantially equal to the diameter d2 of the photospacer 22, and a length of about 9 to 18 μm. Due to the alignment-defective region E2 of the liquid crystal molecules, display quality of alignment-defective region E2 of the liquid crystal molecules deteriorates at the time of driving the liquid crystal device.

In the first embodiment, the photospacer 22 is formed on the inner surface of the common electrode 8 of the color filter substrate 92 at the position adjacent to the left lower corner of the colored layer 6C of cyan (C), the position corresponding to the intersection between the source line 32 and the second wire 33b of the gate line 33 for driving the pixel electrode 10 corresponding to the colored layer 6C, and the position corresponding to the BM. Thus, the alignment-defective region E2 of the liquid crystal molecules, which occurs due to the photospacer 22, occurs in the sub pixel corresponding to the colored layer 6C of cyan (C). Here, among the four colors of red (R), green (G), blue (B) and cyan (C), cyan (C) is subsidiarily used when a color reproduction range need be improved. The cyan (C) has lowest brightness and hardly has influence on the vision of human, compared with red (R), green (G) and blue (B). Thus, the display of the alignment-defective region E2 of the liquid crystal molecules in the sub pixel corresponding to cyan (C) is inconspicuous, compared with the display of the alignment-defective regions E2 of the liquid crystal molecules in the sub pixels corresponding to primary colors of R, G and B. Accordingly, in the first embodiment, it is possible to prevent the display quality from deteriorating due to the alignment-defective region E2 of the liquid crystal molecules.

Second Embodiment

Figure 5:
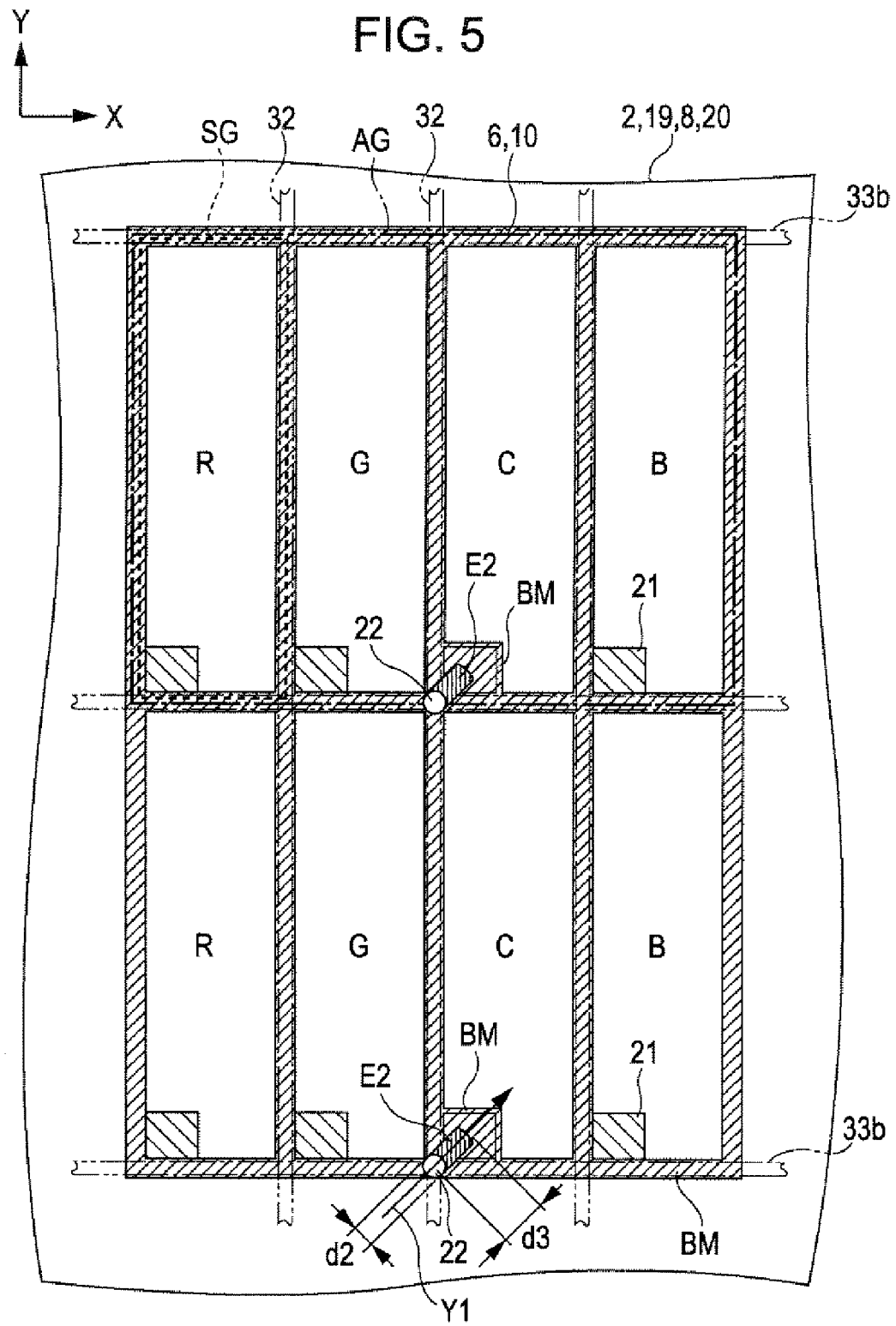
FIG. 5 is a plan view showing a pixel configuration and an alignment structure of a photospacer according to a second embodiment of the invention.

Next, a second embodiment of the invention will be described with reference to FIG. 5. FIG. 5 corresponds to FIG. 3 and is a partial plan view showing a layout corresponding to two pixels according the second embodiment. Hereinafter, the same components as the first embodiment will be denoted by the same reference numerals and their description will be simplified or omitted.

The configuration of the second embodiment is substantially similar to that of the first embodiment. Particularly, in the first embodiment, the photospacer 22 is formed on the color filter substrate 92 at the position adjacent to the left lower corner of the colored layer 6C of cyan (C), the position corresponding to the intersection between the source line 32 and the second wire 33b of the gate line 33, and the position corresponding to the BM. The second embodiment is similar to the first embodiment in that the photospacer 22 is provided at the same position as that of the first embodiment. However, the second embodiment is different from the first embodiment in that the BM is provided on the extension line of the rubbing direction Y1 at a position corresponding to the alignment-defective region E2 of the liquid crystal molecules, in the sub pixel corresponding to cyan (C).

More specifically, in the second embodiment, the left lower corner of each colored layer 6C of cyan (C) is cut out. Thus, the area of the colored layer 6C is less than those of the colored layer 6R, the colored layer 6G and the colored layer 6B. Since the colored layer 6C of cyan (C) is subsidiarily used when the color reproduction range need be improved, the colored layer 6C hardly has influence on the display quality. Since the alignment-defective region E2 of the liquid crystal molecules, which occurs due to the photospacer 22, is positioned on the upper substrate 2 at a cutout region of the left lower corner of each colored layer 6C, in the second embodiment, the BM is provided in the cut-out region so as to prevent the display quality from deteriorating in the cut-out region. It is preferable that the BM provided in the cut-out region of the colored layer 6C extend in a direction in which the alignment-defective region E2 of the liquid crystal molecules occurs in the sub pixel corresponding to the colored layer 6C and has a size for entirely covering the region E2. As can be seen from FIG. 5, since the alignment-defective region E2 of the liquid crystal molecules does not occur in the sub pixels corresponding to the colors of R, G and B, the BM is not provided in the sub pixels corresponding to the colors of R, G and B. Accordingly, it is possible to prevent an aperture ratio from being reduced in the sub pixels corresponding to the colors of R, G and B. That is, for example, when the second embodiment is compared with a comparative example that cutout regions are provided in the left lower corners of the colored layers 6 corresponding to the colors of R, G and B and the BMs are disposed in the cut-out regions, similar to the colored layer 6C of cyan (C), the second embodiment is more excellent than the comparative example in the improvement of the aperture ratio.

In the second embodiment having the above-described configuration, since the alignment-defective region E2 of the liquid crystal molecules is covered by the BM provided in the cut-out region of each colored layer 6C, it is possible to prevent the display quality from deteriorating. Even when the alignment-defective region E2 of the liquid crystal molecules is protruded from the region of the BM provided in the cut-out region of each colored layer 6C to the sub pixel corresponding to each colored layer 6C due to a defect which occurs in the manufacturing process, the display quality is hardly influenced, because the region is positioned in the sub pixel corresponding to each colored layer 6C of cyan (C).

Third Embodiment

Figure 6:
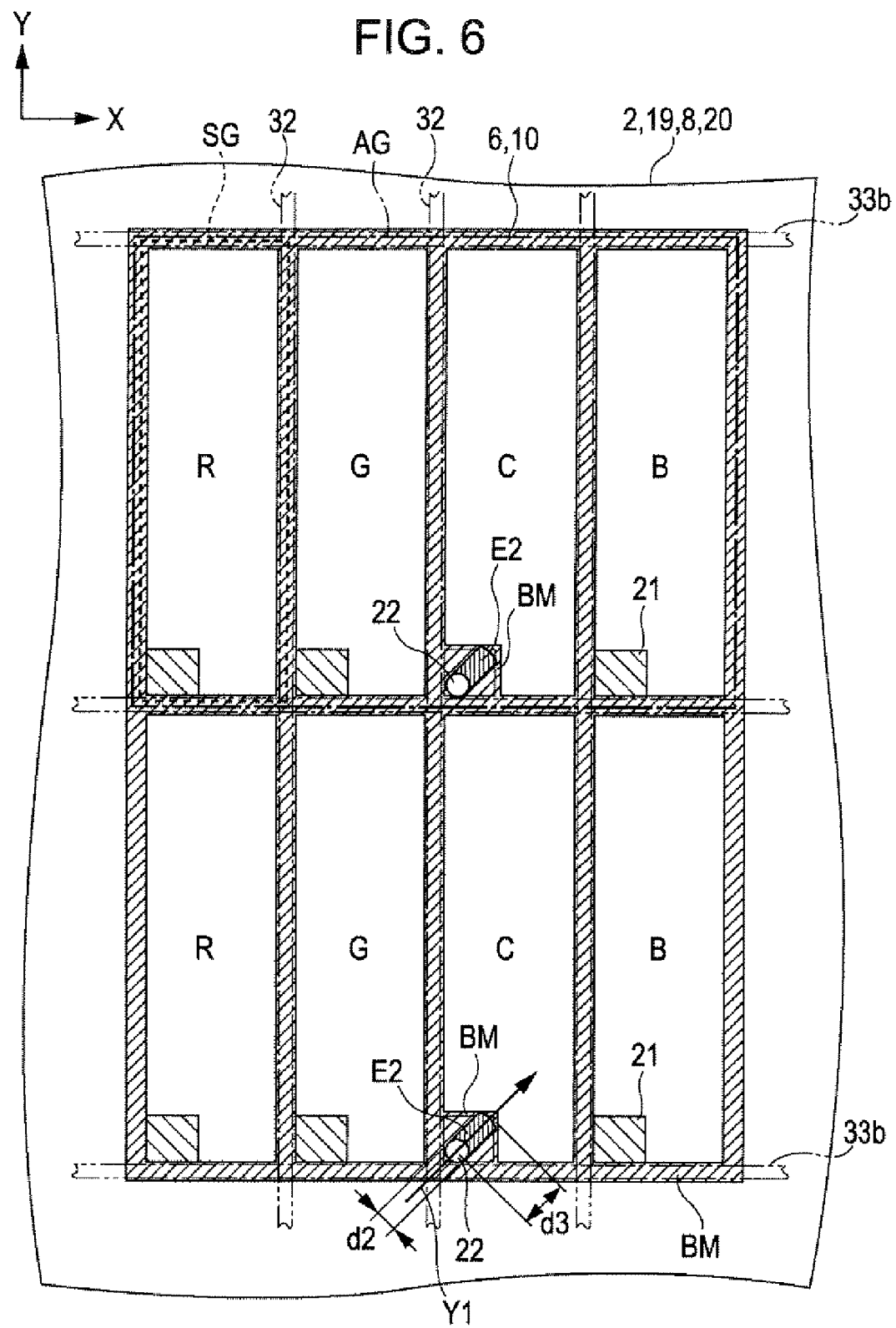
FIG. 6 is a plan view showing a pixel configuration and an alignment structure of a photospacer according to a third embodiment of the invention.

Next, a third embodiment of the Invention will be described with reference to FIG. 6. FIG. 6 corresponds to FIG. 3 and is a partial plan view showing a layout corresponding to two pixels according the third embodiment. Hereinafter, the same components as the aforementioned embodiments will be denoted by the same reference numerals and their description will be simplified or omitted.

The configuration of the third embodiment is substantially similar to those of the first and second embodiments. However, while the photospacer 22 is provided at the outside of the sub pixel region corresponding to the colored layer 6C of cyan (C) in the first and second embodiments, the photospacer 22 is provided in the sub pixel region corresponding to the colored layer 6C of cyan (C), in the third embodiment.

More specifically, in the third embodiment, the left lower corner of each colored layer 6C is cut out, similar to the second embodiment. Thus, the area of the colored layer 6c is less than those of the colored layer 6R, the colored layer 6G and the colored layer 6B and the display quality is hardly influenced from the same reason as the second embodiment. In the third embodiment, since the alignment-defective region E2 of the liquid crystal molecules is positioned on the upper substrate 2 at a cut-out region of the left lower corner of each colored layer 6C, the BM is provided in the cut-out region so as to prevent the display quality from deteriorating in the cut-out region, similar to the second embodiment. It is preferable that the BM provided in the cut-out region has the same size as that of the second embodiment.

Accordingly, the BM corresponding to the cut-out region overlaps the TFT element 21 for driving the pixel electrode 10 corresponding to the colored layer 6C of cyan (C) on the element substrate 91. Particularly, the photospacer 22 is provided at a position which overlaps the cut-out region of the left lower corner in the colored layer 6C, a position which overlaps the TFT element 21, and a position which overlaps the BM, in the sub pixel corresponding to the colored layer 6C of cyan (C) on the color filter substrate 92.

As can be seen from FIG. 6, since the alignment-defective region E2 of the liquid crystal molecules does not occur in the sub pixels corresponding to the colors of R, G and B, the BM is not provided in the sub pixels corresponding to the colors of R, G and B, similar to the second embodiment. Accordingly, the same effect as the second embodiment can be obtained.

In the third embodiment having the above-described configuration, since the alignment-defective region E2 of the liquid crystal molecules is covered by the BM, it is possible to prevent the display quality from deteriorating, similar to the second embodiment.

Fourth Embodiment

Next, a fourth embodiment of the invention will be described with reference to FIGS. 7 and 8.

Figure 7:
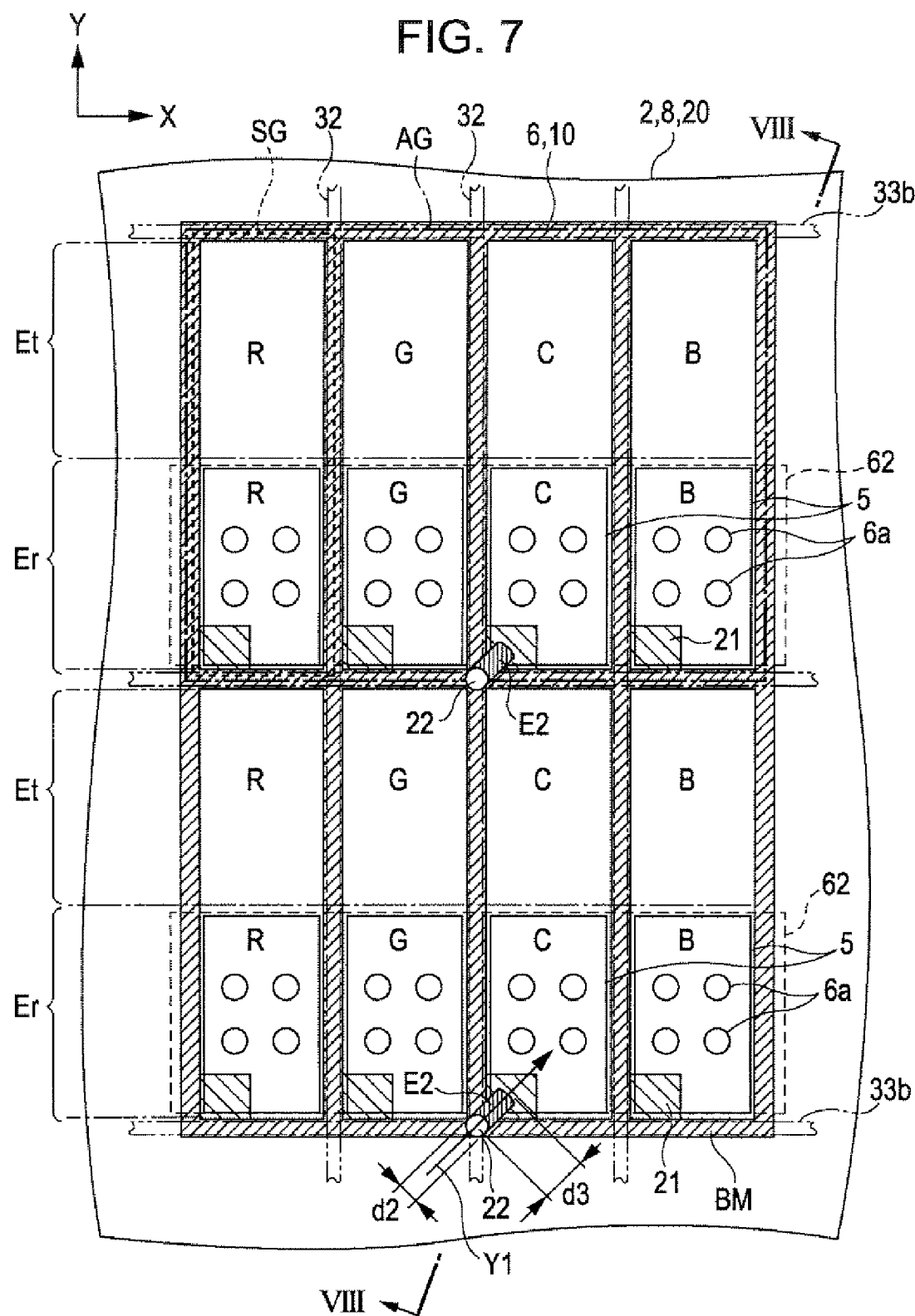
FIG. 7 is a plan view showing a pixel configuration and an alignment structure of a photospacer according to a fourth embodiment of the invention.

FIG. 7 corresponds to FIG. 3 and is a partial plan view showing a layout corresponding to two pixels according the fourth embodiment. In FIG. 7, in order to facilitate understanding of a relative positional relationship between the components of a color filter substrate 94 and the components of an element substrate 93, the pixel electrodes 10, the TFT elements 21, the source lines 32 and the second wires 33b of the gate lines 33, which are provided at the element substrate 93, are also shown. Hereinafter, the same components as the aforementioned embodiments will be denoted by the same reference numerals and their description will be simplified or omitted.

While the invention applies to the transmissive type liquid crystal device in the first to third embodiments, the invention applies to a semi-transmissive reflective liquid crystal device in the fourth embodiment. In the fourth embodiment, it is preferable that the optical concentration of the colored layer 6 provided in a transmissive region Et is equal to that of the colored layer 6 provided in the reflective region Er.

First, the planar configuration of the liquid crystal device according to the fourth embodiment will be described with reference to FIG. 7 and the cross-sectional configuration of the liquid crystal device according to the fourth embodiment will be described with reference to FIG. 8.

First, the planar configuration of the liquid crystal device according to the fourth embodiment will be described. In FIG. 7, one pixel region AG includes the transmissive region Et for performing a transmissive display mode and the reflective region Er for performing a reflective display mode, which is adjacent to the transmissive region Er in the Y direction.

The BM is formed on the upper substrate 2 at a position for partitioning each sub pixel region SG and the colored layers 6R, 6G, 6C and 6B are provided on the inner surface of the upper substrate 2 at a position corresponding to each sub pixel region SG in the same arrangement order as the first embodiment, for each pixel region AG. A plurality of non-colored regions 6a for adjusting the optical concentration is provided in the colored layers 6 corresponding to the reflective region Er. The reason why the plurality of non-colored regions 6a is provided in the colored layers 6 corresponding to the reflective region Er is as follows.

That is, while the illumination light from the backlight 15 passes through the colored layer 6 only once in the transmissive region Et, the external light reciprocally passes through the colored layer 6 two times in the reflective region Er. Thus, while the bright display is possible but chroma is hard to increase in the transmissive display mode, the chroma is easy to increase but the brightness is sacrificed in the reflective display mode. In order to solve this problem, by adjusting the amounts of coloring materials in the colored layer 6 corresponding to the transmissive region Et and the colored layer 6 corresponding to the reflective region Er, the chroma and the brightness of the light which passes through the colored layer 6 corresponding to the transmissive region Et and the chroma and the brightness of the light which passes through the colored layer 6 corresponding to the reflective region Er must be set to suitable states. However, when this method is employed, the number of the manufacturing processes increases and the product cost increases. Accordingly, in the fourth embodiment, the above-described problems are solved by providing the plurality of non-colored regions 6a in the colored layers 6 corresponding to the reflective region Er. That is, in the fourth embodiment, the display properties having suitable brightness and chroma are obtained in the transmissive display mode and the reflective display mode by providing the plurality of non-colored regions 6a in the colored layers 6 corresponding to the reflective region Er. In the invention, instead of this configuration, the optical concentrations of the colored layers 6R, 6G, 6B and 6C corresponding to the reflective region Er may be set to be lower than those of the colored layers 6R, 6G, 6B and 6C corresponding to the transmissive region Et.

Figure 8:
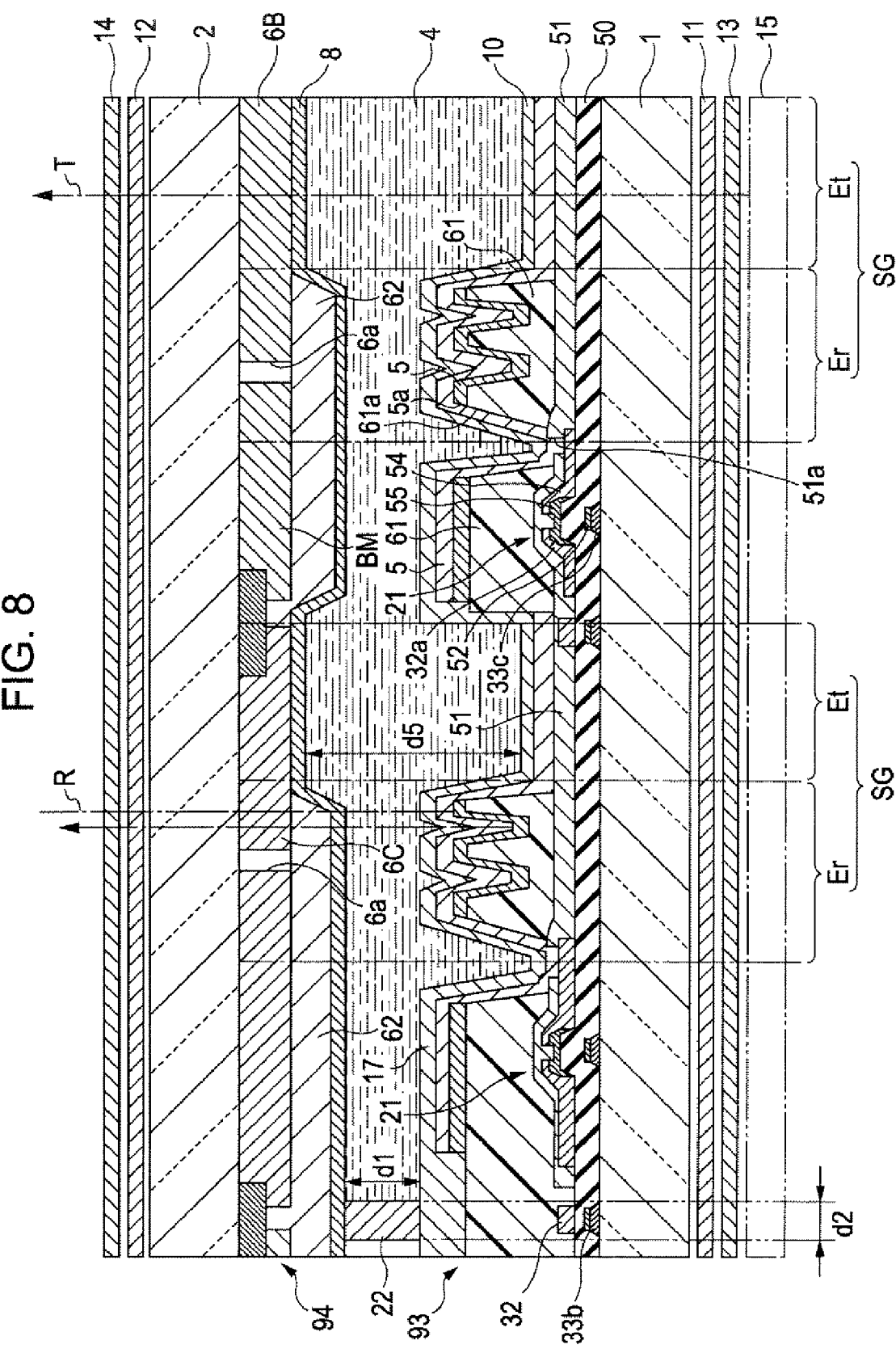
FIG. 8 is a partial cross-sectional view taken along line VIII-VIII of FIG. 7.

On at least the inner surfaces of the colored layers 6 corresponding to the reflective region Er, a step-difference film 62 (cell thickness adjusting film) is provided as a step-difference forming film made of a resin material having transparency, such as acrylic resin, and having a function for adjusting a cell gap (see FIG. 8). The common electrode 8 is formed on the inner surfaces of the colored layers 6 corresponding to the transmissive region Et and the step-difference film 62.

Particularly, the photospacer 22 is provided on the common electrode 8 of the color filter substrate 94 at a position adjacent to the left lower corner of each colored layer 6C of cyan (C) corresponding to the reflective region Er, a position corresponding to the intersection between the source line 32 and the second wire 33b of the gate line 33, and a position corresponding to the BM. Although the alignment film 20, which is subjected to the rubbing process in the direction denoted by the arrow Y1, is formed on the photospacer 22 and the common electrode 8, the alignment film is not shown in FIG. 8.

Next, the cross-sectional configuration of the liquid crystal device according to the fourth embodiment will be briefly described with reference to FIG. 8. FIG. 8 is a cross-sectional view taken along line VIII-VIII of FIG. 7 and more particularly a cross-sectional view corresponding to about two pixels cut in a position which passes through the photospacer 22. In FIG. 8, for convenience sake, the alignment film 20 or the like is not shown.

The TFT element 21 having the above-described lamination structure is provided on the lower substrate 1 at the corner of each colored layer 6. An interlayer film 61 (another cell thickness adjusting film) having a function for adjusting the thickness (cell gap) of the liquid crystal layer 4 together with the step-difference film 62 and made of a resin material having transparency, such as acrylic resin, is provided on at least the inner surface of the passivation layer 51 corresponding to the reflective region Er and the inner surface of the passivation layer 51 corresponding to the TFT element 21. A plurality of irregularities is formed on the surface of the interlayer film 61 corresponding to the reflective region Er. The interlayer film 61 has a contact hole 61a at a position corresponding to one end of the drain electrode 54 which is the component of each TFT element 21. A reflective film 5 made of a material having reflectivity, such as aluminum, aluminum alloy or silver alloy, is formed on the interlayer film 61 corresponding to the reflective region Er. Since the reflective film 5 is formed on the interlayer film 61 having the plurality of irregularities, the reflective film 5 also has a plurality of irregularities. Accordingly, it is possible to appropriately scatter the light which enters the liquid crystal device. The reflective film 5 has an opening 5a at a position corresponding to the contact hole 61a of the interlayer film 61. The pixel electrode 10 having the substantial same size as the sub pixel region SG is formed on at least the inner surface of the reflective film 5 corresponding to the reflective region Er and the inner surface of the passivation layer 51 corresponding to the transmissive region Et. The alignment film 17, which is subjected to the rubbing process in the predetermined direction, is formed on the inner surface of the pixel electrode 10 or the like.

By this configuration, the element substrate 93 according to the fourth embodiment is configured.

Meanwhile, on the upper substrate 2, the colored layer 6C is provided in one sub pixel region SG and the colored layer 6B is provided in another sub pixel region SG adjacent to the one sub pixel region SG. The BM is provided on the upper substrate 2 at a position for partitioning the sub pixel region SG.

Particularly, the photospacer 22 is provided on the common electrode 8 of the color filter substrate 94 at the position adjacent to the left lower corner of each colored layer 6C of cyan (C) corresponding to the reflective region Er, the position corresponding to the intersection between the source line 32 and the second wire 33b of the gate line 33, and the position corresponding to the BM. The other cross-sectional configuration is described above and thus their description will be omitted. By the above-described configuration, the color filter substrate 94 according to the fourth embodiment is configured.

The element substrate 93 and the color filter substrate 94 are adhered to each other through the frame-shaped seal material 7 to form the liquid crystal layer 4. In this liquid crystal device, the thickness d5 of the liquid crystal layer corresponding to the transmissive region et is set to be greater than the thickness d1 of the liquid crystal layer 4 corresponding to the reflective region Er by the photospacer 22 disposed at the predetermined position to configure a multi-gap structure. Accordingly, adequate display properties can be obtained in the transmissive display mode and the reflective display mode.

In the liquid crystal device according to the fourth embodiment having the above-described configuration, when the transmissive display mode is performed, the illumination light emitted from the backlight 15 advances along a path T shown in FIG. 8 and reaches the viewer through the pixel electrodes 10, the common electrode 8 and the colored layers 6. Thus, the illumination light passes through the colored layers 6 to show predetermined color and brightness. Accordingly, the viewer can view a desired color display image. Meanwhile, when the reflective display mode is performed, the external light which enters the liquid crystal device advances along a path R shown in FIG. 8. That is, the external light which enters the liquid crystal device reflects from the reflective film 5 and reaches the viewer. In this case, the external light passes through the regions in which the colored layers 6 are formed, reflects from the reflective film 5 positioned below the colored layers 6, and passes through the colored layers 6 again, thereby showing predetermined color and brightness. Accordingly, the viewer can view a desired color display image.

Particularly, since the liquid crystal device according to the fourth embodiment uses the four colors of R, G, C and B, the brightness of the light of G having high human visibility is suppressed from being reduced and, in a CIE chromaticity diagram, a color reproduction range (chromaticity range) is greater than that of a liquid crystal device using three colors of R, G and B.

The fourth embodiment having the above-described configuration has the following effects.

In general, in the semi-transmissive reflective type liquid crystal device, the reflective display mode is used as the aid of the transmissive display mode and usage frequency of the reflective display mode is less than that of the transmissive display mode. Accordingly, the alignment-defective region E2 of the liquid crystal molecules, which occurs due to the photospacer 22, is preferably set to a position corresponding to the reflective region Er, instead of a position corresponding to the transmissive region Et. In the semi-transmissive reflective type liquid crystal device having the multi-gap structure, the photospacer 22 is preferably provided at the position corresponding to the reflective region Er, instead of the position corresponding to the transmissive region Et, because, in the reflective region, the height (thickness) of the photospacer 22 may be reduced and thus the size of the alignment-defective region E2 of the liquid crystal molecules may be reduced.

As described above, since, among the four colors of red (R), green (G), blue (B) and cyan (C), cyan (C) is subsidiarily used when the color reproduction range need be improved, has lowest brightness and hardly has influence on the vision of human, compared with red (R), green (G) and blue (B), when the alignment-defective region E2 of the liquid crystal molecules is set in the sub pixel corresponding to cyan (C), the display of the alignment-defective region is made inconspicuous, compared with a case where the alignment-defective region E2 of the liquid crystal molecules is set in the sub pixels corresponding to primary colors of R, G and B.

In consideration of the above-described points, in the fourth embodiment, the photospacer 22 is provided on the common electrode 8 of the color filter substrate 94 at the position adjacent to the left lower corner of each colored layer 6C of cyan (C) corresponding to the reflective region Er, the position corresponding to the intersection between the source line 32 and the second wire 33b of the gate line 33, and the position corresponding to the BM. Accordingly, the alignment-defective region E2 of the liquid crystal molecules, which occurs due to the photospacer 22, occurs in the sub pixel corresponding to the colored layer 6C of cyan (C) corresponding to the reflective region Er. Accordingly, it is possible to prevent the display quality from deteriorating due to the alignment-defective region E2 of the liquid crystal molecules.

Fifth Embodiment

Next, a fifth embodiment of the invention will be described with reference to FIG. 9.

Figure 9:
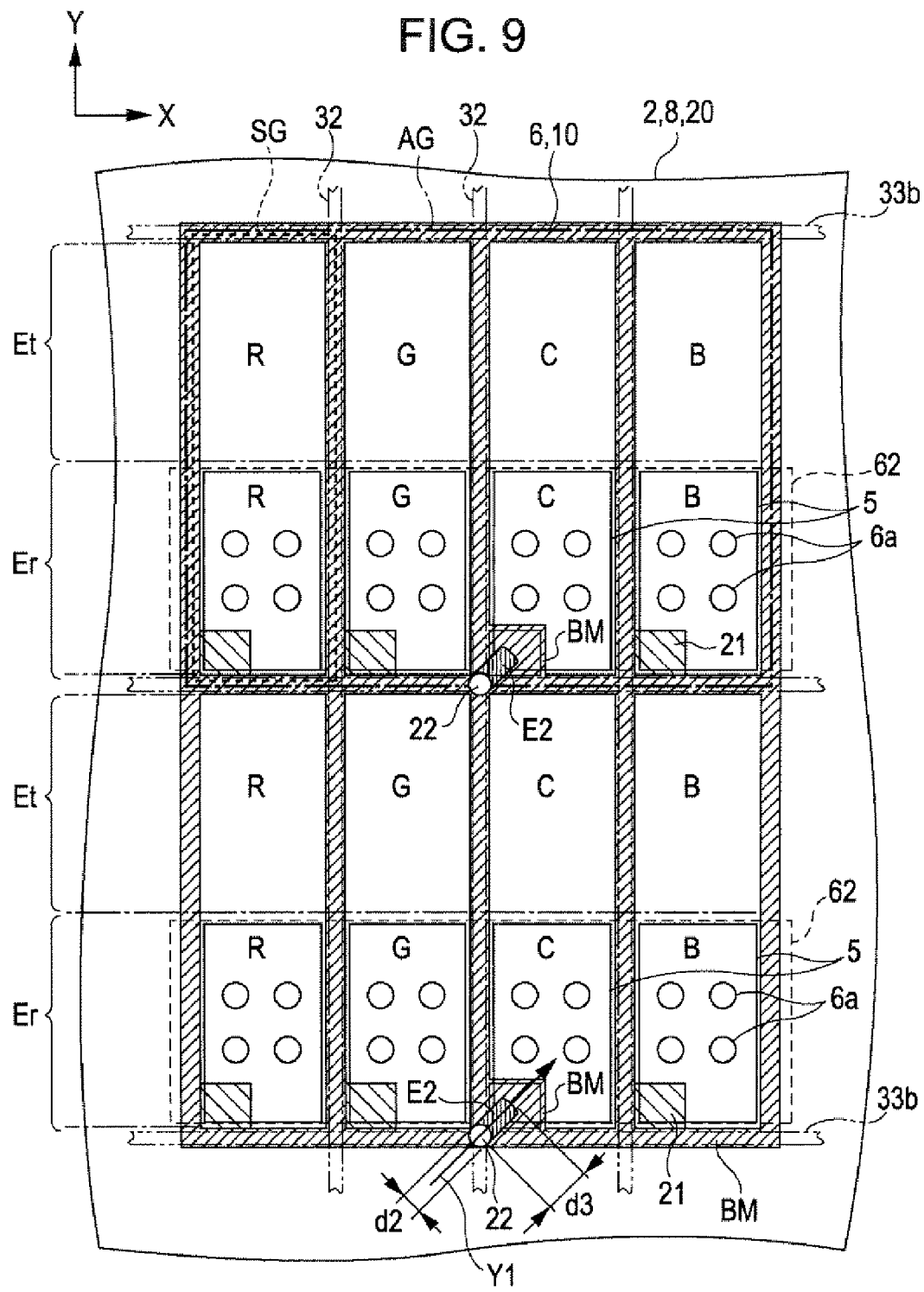
FIG. 9 is a plan view showing a pixel configuration and an alignment structure of a photospacer according to a fifth embodiment of the invention.

FIG. 9 corresponds to FIG. 7 and is a partial plan view showing a layout corresponding to two pixels according the fifth embodiment. In FIG. 9, in order to facilitate understanding of a relative positional relationship between the components of the color filter substrate 94 and the components of the element substrate 93, the pixel electrodes 10, the TFT elements 21, the source lines 32 and the second wires 33b of the gate lines 33, which are provided at the element substrate 93, are shown. Hereinafter, the same components as the aforementioned embodiments will be denoted by the same reference numerals and their description will be simplified or omitted.

The configuration of the fifth embodiment is substantially similar to that of the fourth embodiment. Particularly, in the fourth embodiment, the photospacer 22 is formed on the color filer substrate 94 at the position adjacent to the left lower corner of the colored layer 6C of cyan (C) corresponding to the reflective region Er, the position corresponding to the intersection between the source line 32 and the second wire 33b of the gate line 33, and the position corresponding to the BM. The fifth embodiment is similar to the fourth embodiment in that the photospacer 22 is provided at the same position as that of the fourth embodiment. However, the fifth embodiment is different from the fourth embodiment in that the BM is provided at a position corresponding to the alignment-defective region E2 of the liquid crystal molecules in the sub pixel corresponding to the colored layer 6C of cyan (C) in the reflective region Er.

More specifically, in the fifth embodiment, the left lower corner of each colored layer 6C of cyan (C) is cut out, similar to the second embodiment. Thus, the area of the colored layer 6C is less than those of the colored layer 6R, the colored layer 6G and the colored layer 6B. Since the colored layer 6C of cyan (C) is subsidiarily used when the color reproduction range need be improved, the colored layer 6C hardly has influence on the display quality. Since the alignment-defective region E2 of the liquid crystal molecules, which occurs due to the photospacer 22, is positioned on the upper substrate 2 at a cut-out region of the left lower corner of each colored layer 6C in the reflective region Er, in the fifth embodiment, the BM is provided in the cut-out region so as to prevent the display quality from deteriorating in the cut-out region. In the fifth embodiment, it is preferable that the BM provided in the sub pixel corresponding to cyan (C) in the reflective region Er has the same size as that of the second embodiment. As can be seen from FIG. 9, since the alignment-defective region E2 of the liquid crystal molecules does not occur in the sub pixels corresponding to the colors of R, G and B, the BM is not provided in the sub pixels corresponding to the colors of R, G and B.

Accordingly, it is possible to prevent an aperture ratio from being reduced in the sub pixels corresponding to the colors of R, G and B by the same reason as the second embodiment.

In the fifth embodiment having the above-described configuration, since the alignment-defective region E2 of the liquid crystal molecules is covered by the BM at the time of driving the liquid crystal device, it is possible to prevent the display quality from deteriorating, similar to the second embodiment.

Sixth Embodiment

Next, a sixth embodiment of the invention will be described with reference to FIG. 10.

Figure 10:
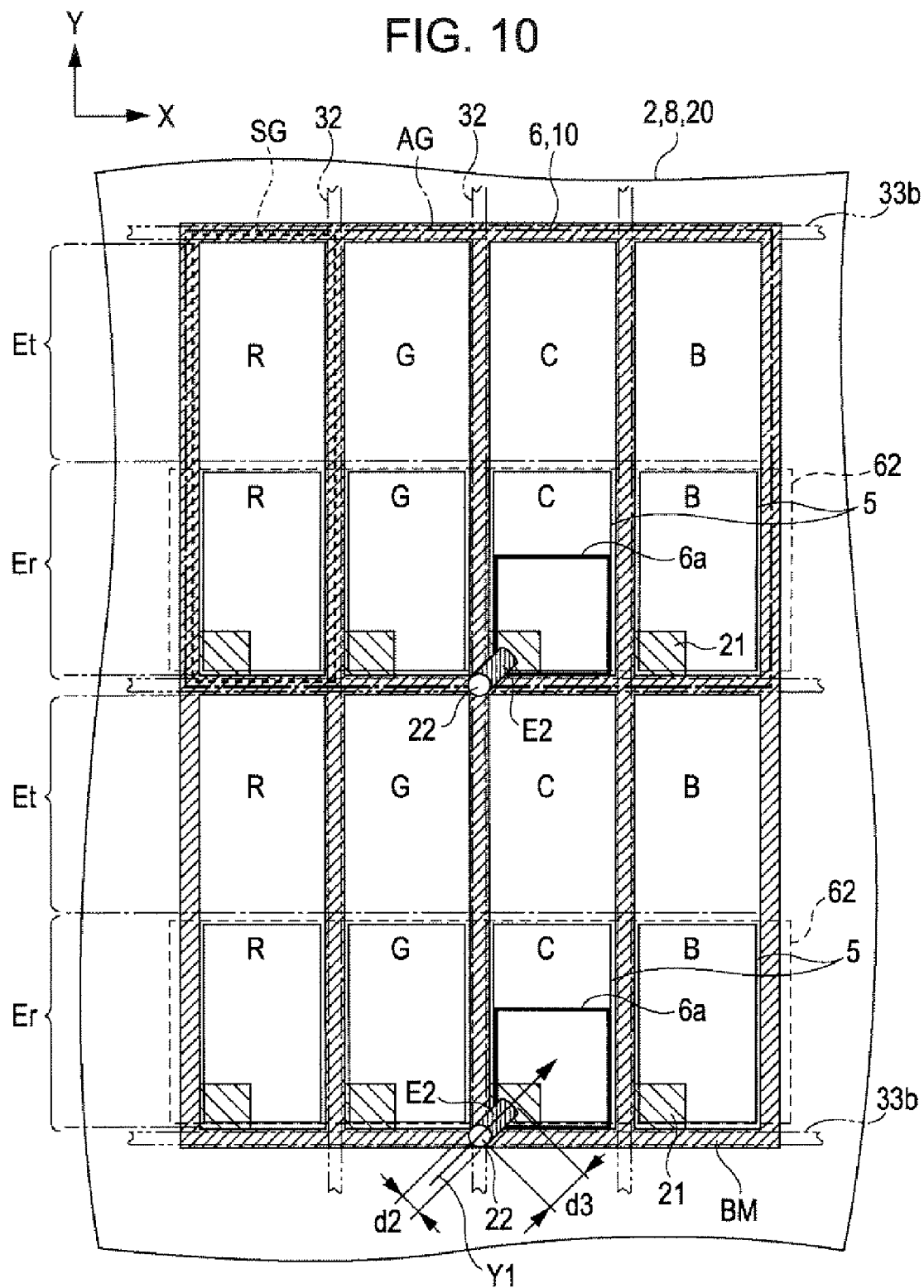
FIG. 10 is a plan view showing a pixel configuration and an alignment structure of a photospacer according to a sixth embodiment of the invention.

FIG. 10 corresponds to FIG. 7 and is a partial plan view showing a layout corresponding to two pixels according the sixth embodiment. In FIG. 10, in order to facilitate understanding of a relative positional relationship between the components of the color filter substrate 94 and the components of the element substrate 93, the pixel electrodes 10, the TFT elements 21, the source lines 32 and the second wires 33b of the gate lines 33, which are provided at the element substrate 93, are also shown. Hereinafter, the same components as the fourth embodiment will be denoted by the same reference numerals and their description will be simplified or omitted.

The configuration of the sixth embodiment is substantially similar to that of the fourth embodiment. Particularly, in the fourth embodiment, the photospacer 22 is formed on the color filer substrate 94 at the position adjacent to the left lower corner of the colored layer 6C of cyan (C) corresponding to the reflective region Er, the position corresponding to intersection between the source line 32 and the second wire 33b of the gate line 33, and the position corresponding to the BM. The sixth embodiment is also similar to the fourth embodiment in that the photospacer 22 is provided at the same position as that of the fourth embodiment. However, the sixth embodiment is different from the fourth embodiment in that a rectangular non-colored region 6a in which a coloring material does not exist is provided in the colored layer 6c of cyan (C) corresponding to the reflective region Er and the alignment-defective region E2 of the liquid crystal molecules, which occurs due to the photospacer 22, is disposed at a position corresponding to the non-colored region 6a. In an example, it is preferable that the non-colored region 6a provided in the colored layer 6C corresponding to the reflective region Er has a size for entirely covering the alignment-defective region E2 of the liquid crystal molecules.

As can be seen from FIG. 10, since the alignment-defective region E2 of the liquid crystal molecules does not occur in the sub pixels corresponding to the colors of R, G and B, the BM is not provided in the sub pixels corresponding to the colors of R, G and B.

In the sixth embodiment having the above-described configuration, the photospacer 22 is formed on the color filer substrate 94 at the position adjacent to the left lower corner of the colored layer 6C of cyan (C) corresponding to the reflective region Er, the position corresponding to the intersection between the source line 32 and the second wire 33b of the gate line 33, and the position corresponding to the BM. Accordingly, the alignment-defective region E1 of the liquid crystal molecules, which occurs due to the photospacer 22, is disposed in the non-colored region 6a provided in the colored layer 6C corresponding to the reflective region Er. The non-colored region 6a provided in the colored layer 6C of the reflective region Er serves to increase the brightness of the sub pixel corresponding to the colored layer 6C of the reflective region 6a and allows the display which occurs in the alignment-defective region E2 of the liquid crystal molecules to be inconspicuous by improving the brightness of the non-colored region 6a. Accordingly, it is possible to the display quality from deteriorating due to the alignment-defective region E2 of the liquid crystal molecules, which occurs due to the photospacer 22.

Seventh Embodiment

Next, a seventh embodiment of the invention will be described with reference to FIGS. 11 and 12.

Figure 11:
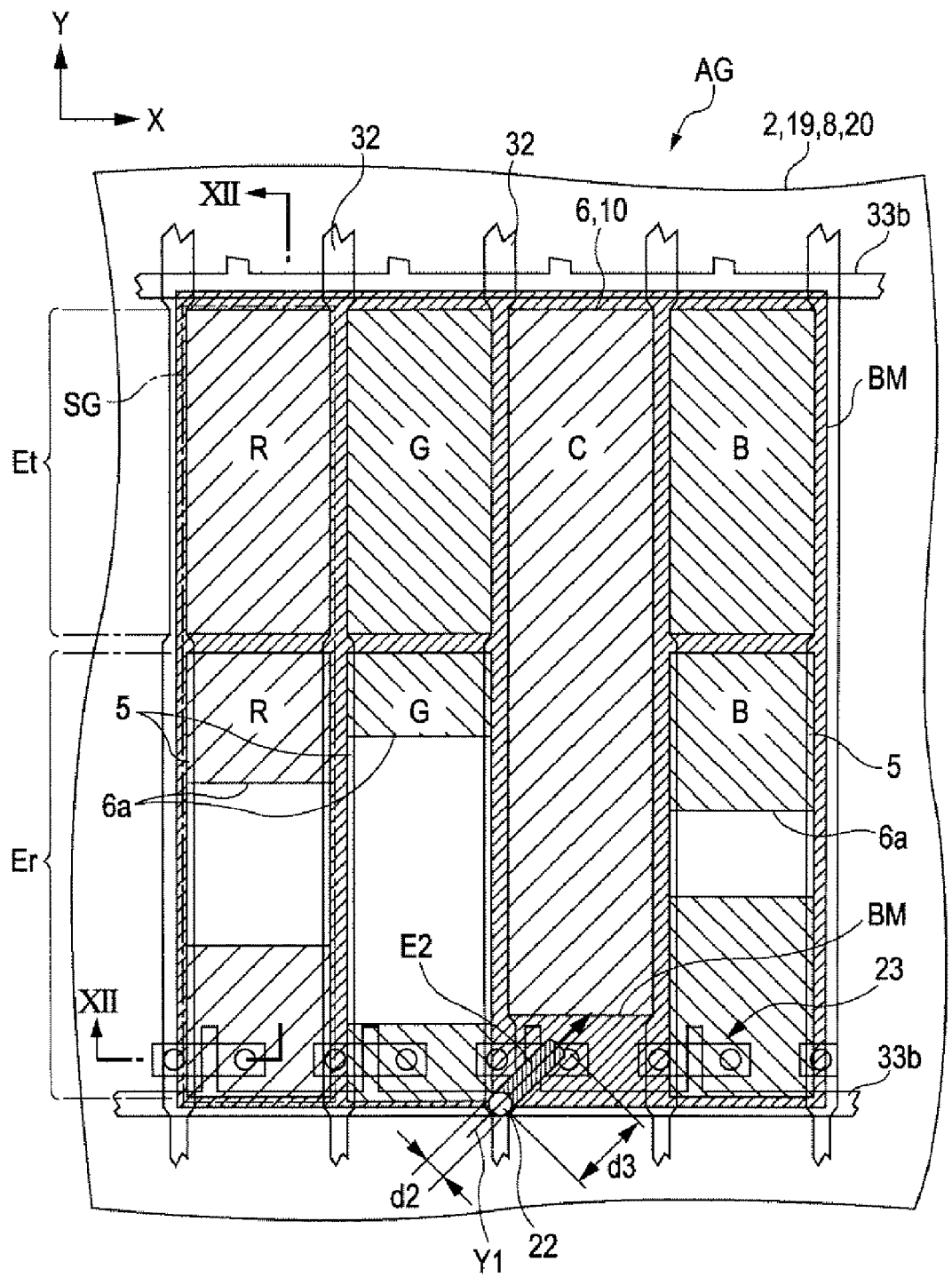
FIG. 11 is a plan view showing a pixel configuration and an alignment structure of a photospacer according to a seventh embodiment of the invention.
Figure 12:
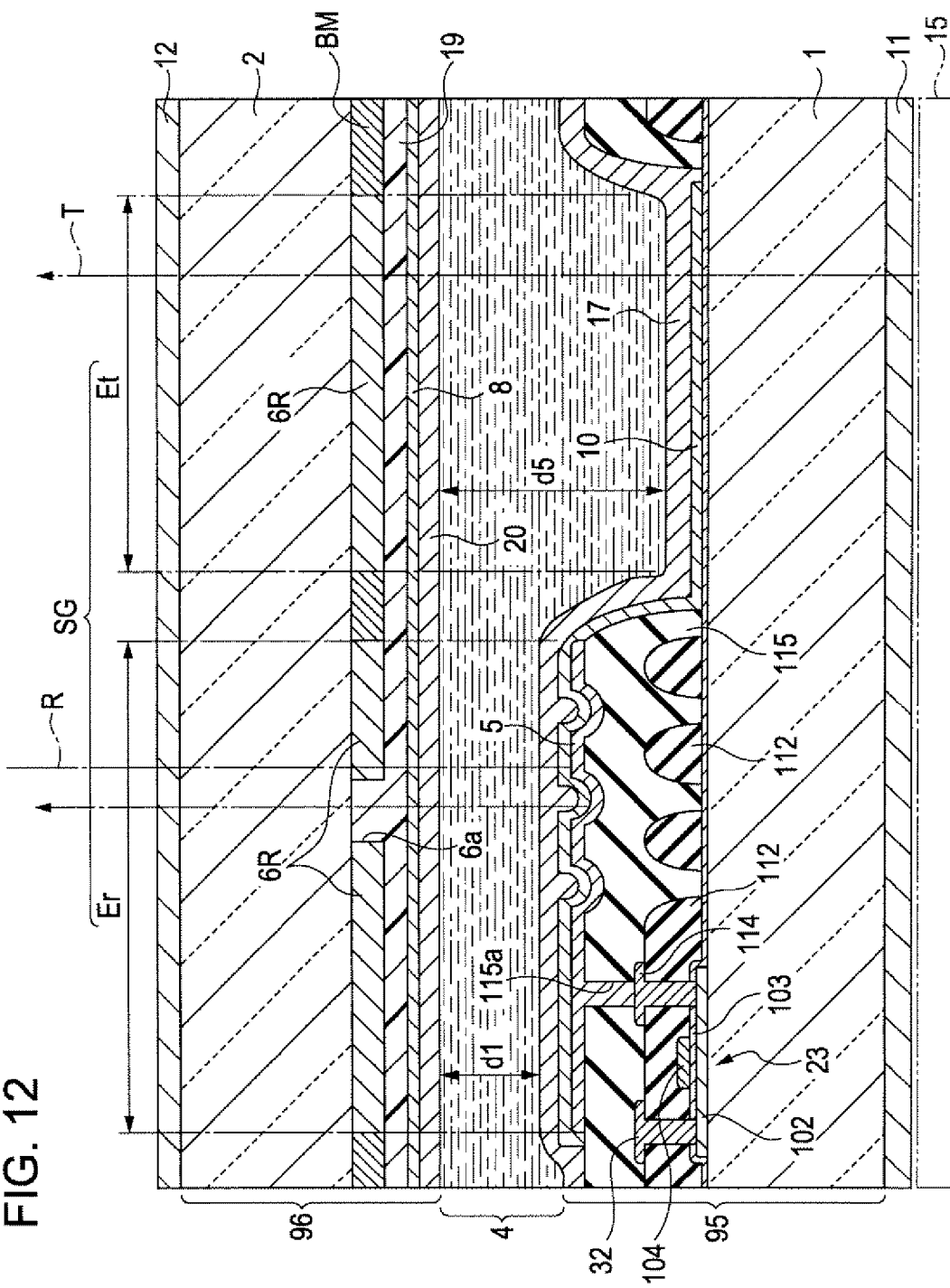
FIG. 12 is a partial cross-sectional view taken along line XII-XII of FIG. 11.

FIG. 11 is a partial plan view showing a layout corresponding to one pixel according the seventh embodiment. FIG. 12 is a partial cross-sectional view taken along line XII-XII of FIG. 11, and more particularly, to a partial cross-sectional view cut in a position which passes through the sub pixel corresponding to the colored layer 6R of red (R). Hereinafter, the same components as the aforementioned embodiment will be denoted by the same reference numerals and their description will be simplified or omitted.

The seventh embodiment relates to the semi-transmissive reflective type liquid crystal device, similar to the fourth to sixth embodiments, but is slightly different from the fourth to sixth embodiments in the configuration. Accordingly, first, the cross-sectional configuration which passes through the sub pixel corresponding to the colored layer 6R will be described with reference to FIG. 12.

A TFT element 23 is provided on the inner surface of the lower substrate 1 at a corner of the reflective region Er. The TFT element 23 includes a semiconductor layer 102 made of a polysilicon layer and formed on the inner surface of the lower substrate 1, a gate insulating film 103 formed on the inner surface of the semiconductor layer 102, and a gate electrode 104 formed on the gate insulating film 103 to face a channel region of the semiconductor layer 102.

An interlayer insulating film 112 made of tantalum oxide or the like is formed on the inner surface of the TFT element 23 positioned in the reflective region Er and on the gate insulating film 103 corresponding to the reflective region Er. Thus, the interlayer insulating film 112 covers the TFT element 23. A plurality of irregularities is formed on a portion of the surface of the interlayer insulating film 112. The source line 32 connected to the source region of the semiconductor layer 102 and a connection electrode 114 connected to the drain region of the semiconductor layer 102 are formed on the interlayer insulating film 112, respectively. An interlayer insulating film 115 made of silicon oxide or the like is further formed on the interlayer insulating film 112. The surface of the interlayer insulating film 115 corresponding to the interlayer insulating film 112 having the plurality of irregularities has a plurality of irregularities. A reflective film 5 is formed on the interlayer insulating film 115 and a portion of the reflective film 5 has a plurality of irregularities which corresponds to the plurality of irregularities of the interlayer insulating film 115. Accordingly, it is possible to adequately scatter the light reflected from the reflective film 5. A portion of the reflective film 5 extends in an opening 115*a* of the interlayer insulating film 115 to be connected to the connection electrode 114. The pixel electrode 10 is formed on the reflective film 5 corresponding to the reflective region Er and the gate insulating film 103 corresponding to the transmissive region Et. Thus, the pixel electrode 10 is electrically connected to the drain region of the TFT element 23 through the reflective film 5. The alignment film 17 which is subjected to the rubbing process in the predetermined direction is formed on the pixel electrode 10. Only the sub pixel region SG corresponding to the colored layer 6C has only the transmissive region Et without the reflective region Er. Accordingly, the element substrate 95 according to the seventh embodiment is configured.

Meanwhile, the colored layers 6R are independently provided in an island shape at positions corresponding to the reflective region Er and the transmissive region Et. A rectangular non-colored region 6*a* for adjusting the optical concentration is provided in the colored layer 6R corresponding to the reflective region Er. The BMs are formed at positions for partitioning the colored layer 6R of the reflective region Er and the colored layer 6R of the transmissive region Et and positions for partitioning adjacent sub pixel region SG, respectively. In the seventh embodiment, the cross-sectional configurations corresponding to the colored layers 6G and 6B are substantially equal to that of the colored layer 6R, but the cross-sectional configuration corresponding to the colored layer 6C is different from those of the colored layers 6R, 6G and 6B. That is, the interlayer insulating films 112 and 115 and the reflective film 5 are not provided in the sub pixel region SG corresponding to the colored layer 6C. That is, the sub pixel region SG corresponding to the colored layer 6C includes only the transmissive region Et. The overcoat layer 19 is formed on the colored layer 6 and the BM. The common electrode 8 is formed on the overcoat layer 19. The alignment film 20 which is subjected to the rubbing process in the direction denoted by the arrow Y1 is formed on the common electrode 8. Accordingly, the color filter substrate 96 according to the seventh embodiment is configured.

The liquid crystal is filled between the element substrate 95 and the color filter substrate 96, which have the above-described configurations, respectively, to form the liquid crystal layer 4. In this liquid crystal device, the photospacer 22 is disposed at positions corresponding to the interlayer insulating films 112 and 115 and a position adjacent to the corner of the colored layer 6C of cyan (C). Thus, the thickness of the liquid crystal layer 4 corresponding to the transmissive region Et is set to d1 and the thickness of the liquid crystal layer 4 corresponding to the reflective region Er is set to d5 (>d1), thereby configuring the multi-gap structure. Accordingly, adequate display properties can be obtained in the transmissive display mode and the reflective display mode. In the liquid crystal device, the transmissive display mode and the reflective display mode can be performed by the same principle as the fourth embodiment.

Next, returning to FIG. 11, the planar configuration of the liquid crystal device according to the seventh embodiment will be described.

The colored layers 6R, 6G, 6C and 6B are provided on the upper substrate 2 in the same arrangement order as the first embodiment, for each pixel region AG. Among the colored layers 6, the colored layers 6R, 6G and 6B are independently provided in an island shape in the reflective region Er and the transmissive region Et. Meanwhile, the colored layer 6C is provided in the sub pixel region SS including only the transmissive region Et, as described above, and has a size having slightly less than that of the sub pixel region SG in a two-dimensional direction. The areas of the colored layers 6R, 6G and 6B corresponding to the transmissive region Et are equal to one another. The area of the colored layer 6C corresponding to the transmissive region Et is greater than those of the colored layers 6R, 6G and 6B corresponding to the transmissive region Et. The non-colored regions 6*a* are provided in the colored layers 6R, 6G and 6B corresponding to the reflective region Er. The non-colored regions 6*a* provided in the colored layers 6R, 6G and 6B are different from one another in the relative size, and the area of the colored layer 6R corresponding to the reflective region Er, the area of the colored layer 6G corresponding to the reflective region Er, and the area of the colored layer 6B corresponding to the reflective region Er are different from one another. By this configuration, the adequate brightness and chroma can be obtained in the transmissive display mode and the reflective display mode. Since the seventh embodiment uses the four colors of R, G, B and C, similar to the aforementioned embodiments, the brightness of the light of G having high human visibility is suppressed from being reduced and, in a CIE chromaticity diagram, the color reproduction range (chromaticity range) is greater than that of the liquid crystal device using three colors of R, G and B.

The BMs are formed at positions for partitioning the colored layers 6R, 6G and 6B of the transmissive region Et and the reflective region Er and a position for partitioning the colored layer 6C. In the sub pixel region SG corresponding to cyan (C), the BM is further formed at the lower side of the colored layer 6C. This configuration is to cover the alignment-defective region E2 of the liquid crystal molecules, which occurs due to the photospacer 22. It is preferable that the BM provided in the sub pixel corresponding to the colored layer 6C of cyan (C) has a size for entirely covering the alignment-defective region E2 of the liquid crystal molecules. The layer structures on the colored layers 6R, 6G, 6C and 6B and the BMs are described above and thus their description will be omitted. The relative positional relationship between the photospacers 22 and the primary components of the element substrate 95 will be described later.

Subsequently, the planar positional relationship between the primary components of the color filter substrate 96 and the primary components of the element substrate 95 will be described.

In the element substrate 95, the source lines 32 extend between the sub pixel regions SG which are adjacent to each other in the X direction and the second wires 33*b* of the gate lines 33 are provided between the sub pixel regions SG which are adjacent to each other in the Y direction. Thus, the source lines 32 and the second wires 33*b* of the gate lines 33 overlap the BMs. In the element substrate 95, the pixel electrodes 10 are provided at the positions corresponding to the sub pixel regions SG and the colored layers 6R, 6G, 6C and 6B overlap the pixel electrodes 10 corresponding thereto. In the element substrate 95, the TFT elements 23 are provided at positions corresponding to the left lower corners of the sub pixel regions SG and the left lower corners of the colored layers 6R, 6G and 6B corresponding to the reflective region Er overlap the TFT elements 23.

Particularly, in the seventh embodiment, the photospacer 22 is provided on the color filter substrate 96 at the position adjacent to the left lower corner of the sub pixel region SG corresponding to the colored layer 6C of cyan (C), the position corresponding to the intersection between the source line 32 and the second wire 33*b* of the gate line 33, and the position which overlaps the BM. Thus, the alignment-defective region E2 of the liquid crystal molecules, which occurs due to the photospacer 22, is disposed at the position which overlaps the BM provided at the lower side of the sub pixel region SG corresponding to the colored layer 6C of cyan (C). Accordingly, since the alignment-defective region E2 of the liquid crystal molecules is covered by the BM provided at the lower side of the sub pixel region SG corresponding to the colored layer 6C, it is possible to prevent the display quality from deteriorating.

In the seventh embodiment, since the alignment-defective region E2 of the liquid crystal molecules does not occur in the sub pixels of R, G and B, the BM is not provided in the sub pixels. Accordingly, it is possible to prevent the aperture ratio of the sub pixels of R, G and B from being reduced.

Eighth Embodiment

Next, an eighth embodiment of the invention will be described with reference to FIG. 13.

Figure 13:
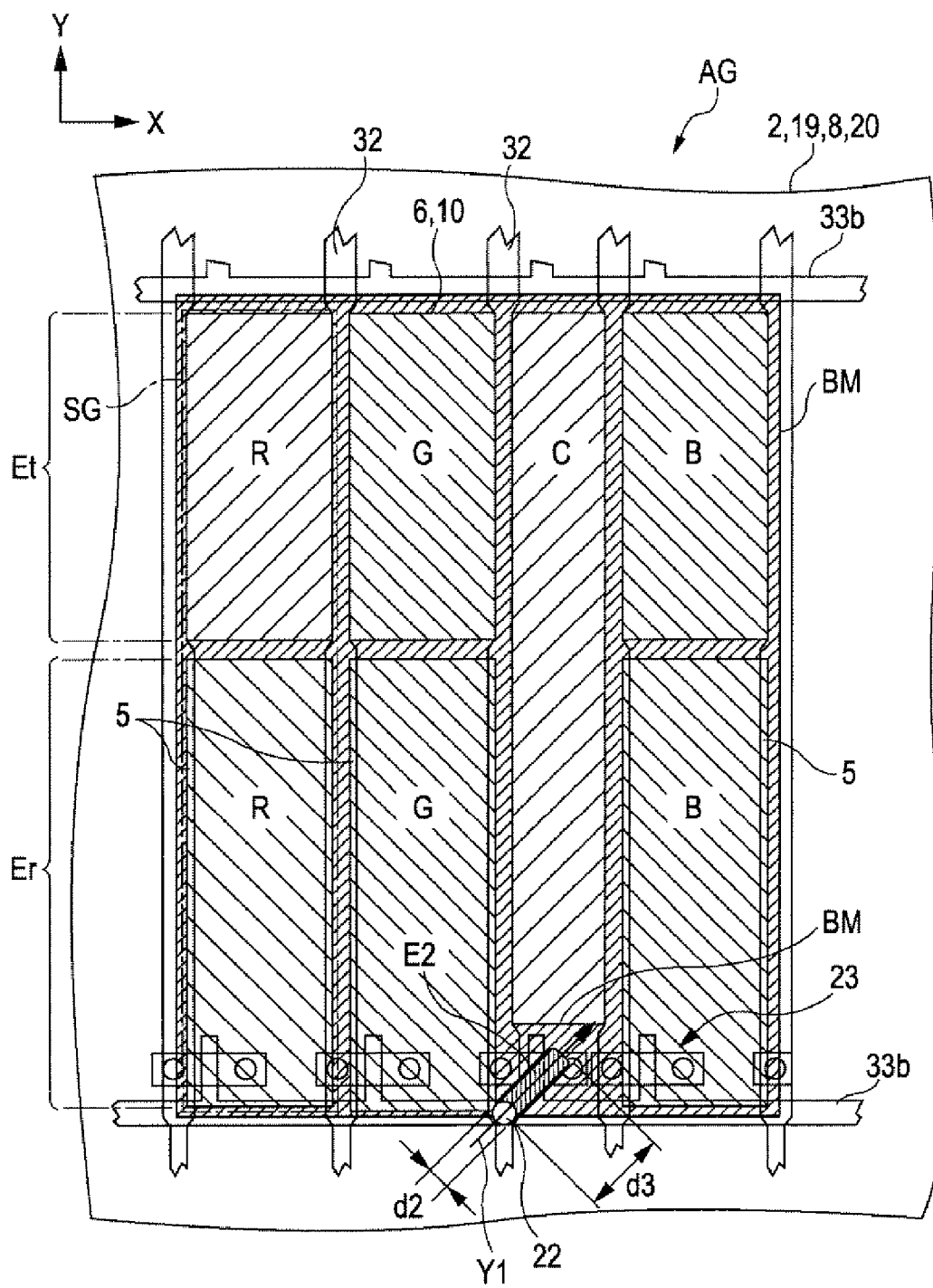
FIG. 13 is a plan view showing a pixel configuration and an alignment structure of a photospacer according to an eighth embodiment of the invention.

FIG. 13 corresponds to FIG. 11 and is a partial plan view showing a layout corresponding to one pixel according the eighth embodiment. In FIG. 13, in order to facilitate understanding of a relative positional relationship between the components of the color filter substrate 96 and the components of the element substrate 95, the pixel electrodes 10, the TFT elements 23, the source lines 32 and the second wires 33b of the gate lines 33, which are provided at the element substrate 95, are also shown. Hereinafter, the same components as the aforementioned embodiments will be denoted by the same reference numerals and their description will be simplified or omitted.

The eighth embodiment is different from the seventh embodiment in the configuration as follows.

That is, in the seventh embodiment, the non-colored regions 6a for adjusting the optical concentration are provided in the colored layer 6R of the reflective region Er, the colored layer 6G of the reflective region Er, and the colored layer 6B of the reflective region Er. In contrast, in the eighth embodiment, the non-colored region 6a for adjusting the optical concentration is not provided in the colored layer 6R of the reflective region Er, the colored layer 6G of the reflective region Er, and the colored layer 6B of the reflective region Er. The area of the colored layer 6C of the eighth embodiment is less than that of the colored layer 6C of the seventh embodiment. The eighth embodiment and the seventh embodiment are different from each other in the configuration as described above. In an example, in the eighth embodiment, it is preferable that the area of the colored layer 6C provided only in the transmissive region Et is substantially equal to those of the colored layers 6R, 6G and 6B corresponding to the transmissive region Et. Accordingly, it is possible to facilitate the generation of image data and the control of the sub pixel when a desired color is reproduced when a desired color is reproduced using the four colors of R, G, B and C.

In the eighth embodiment having the above-described configuration, the photospacer 22 is disposed at the same position as that of the seventh embodiment. Accordingly, the same effect as the seventh embodiment can be obtained.

Ninth Embodiment

Next, a ninth embodiment of the invention will be described with reference to FIG. 14.

Figure 14:
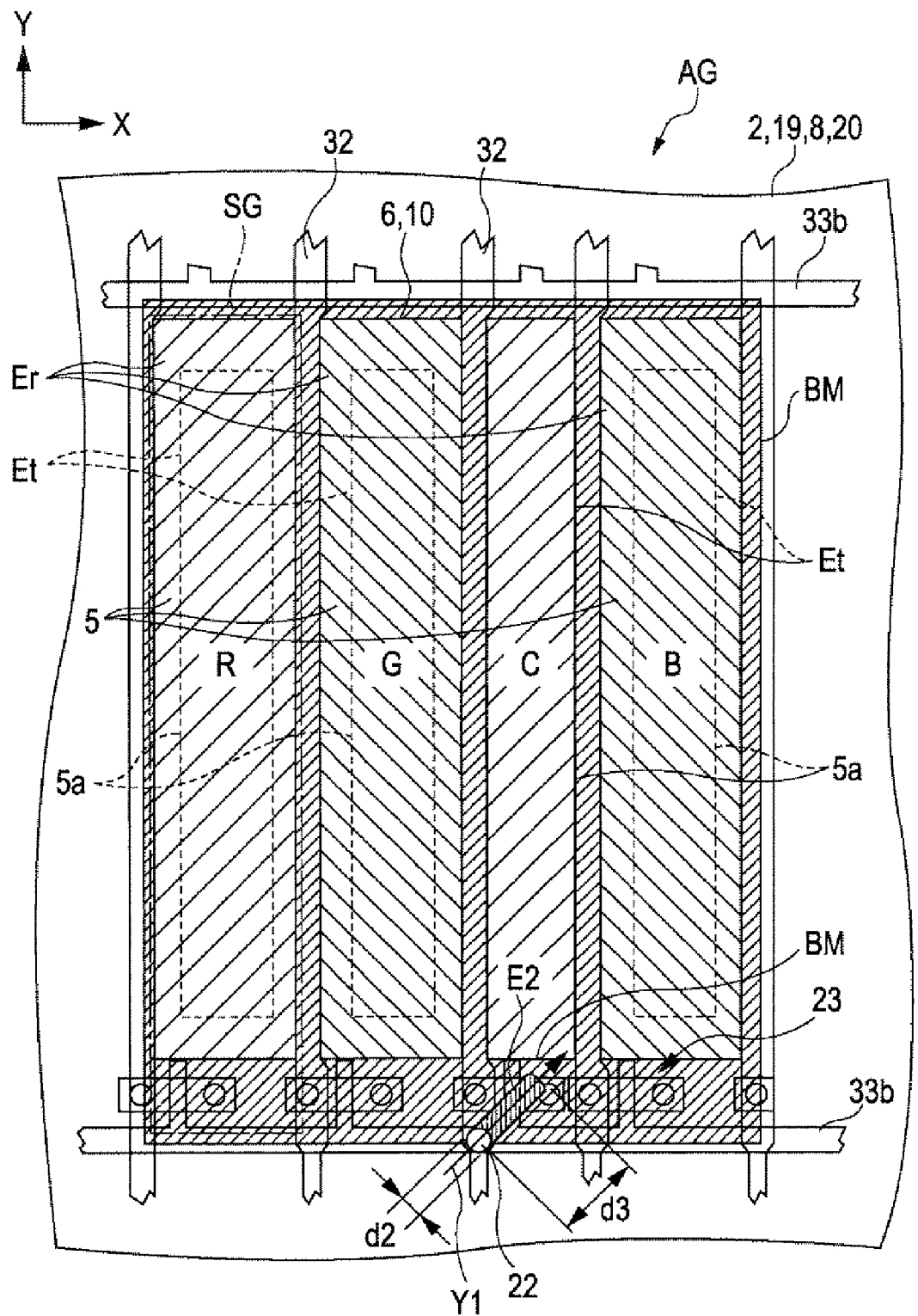
FIG. 14 is a plan view showing a pixel configuration and an alignment structure of a photospacer according to a ninth embodiment of the invention.

FIG. 14 corresponds to FIG. 11 and is a partial plan view showing a layout corresponding to one pixel according the ninth embodiment. In FIG. 14, in order to facilitate understanding of a relative positional relationship between the components of the color filter substrate 96 and the components of the element substrate 95, the pixel electrodes 10, the TFT elements 23, the source lines 32 and the second wires 33b of the gate lines 33, which are provided at the element substrate 95, are also shown. Hereinafter, the same components as the aforementioned embodiments will be denoted by the same reference numerals and their description will be simplified or omitted.

The ninth embodiment is different from the eighth embodiment in the configuration as follows.

That is, in the eighth embodiment, the reflective films 5 are provided on the element substrate 95 in the island shape at the positions corresponding to the colored layers 6R, 6G and 6B of the reflective region Er. In contrast, in the ninth embodiment, the reflective films 5 are formed on the element substrate 95 in a stripe shape to face the plurality of colored layers 6 which is arranged in the X direction of FIG. 14. Openings 5a are provided in an island shape in the reflective films 5 positioned in the sub pixel regions SG of the colored layers 6R, 6G and 6B and an opening 5a is provided in the reflective film 5 positioned in the sub pixel region corresponding to the colored layer 6C over the entire surface. Thus, in the ninth embodiment, in the sub pixel regions SG corresponding to the colored layers 6R, 6G and 6B, the openings 5a provided in the reflective films 5 become the transmissive regions Et and the outer sides of the transmissive regions Et become the reflective regions Er. Meanwhile, the entire surface of the sub pixel region SG corresponding to the colored layer 6C becomes the transmissive region Et. The BMs are provided at the lower sides of the sub pixel regions SG corresponding to the colored layers 6R, 6B, 6G and 6C. Particularly, the BM provided in the sub pixel region SG of the colored layer 6C of cyan (C) serves to cover the alignment-defective region E2 of the liquid crystal molecules, which occurs due to the photospacer 22. It is preferable that the BM provided in the sub pixel corresponding to cyan (C) has a size for entirely covering the alignment-defective region E2 of the liquid crystal molecules.

Particularly, in the ninth embodiment, the photospacer 22 is disposed at the same position as that of the seventh embodiment. Accordingly, the same effect as the seventh embodiment can be obtained. Since, the BMs positioned in the sub pixel regions SG of the colored layers 6R, 6G and 6B are provided at the same position as the lower side of the sub pixel region SG of the colored layer 6C, the display properties are uniform to some extent in the colored layers 6R, 6G, 6B and 6C.

Tenth Embodiment

Next, a tenth embodiment of the invention will be described with reference to FIG. 15.

Figure 15:
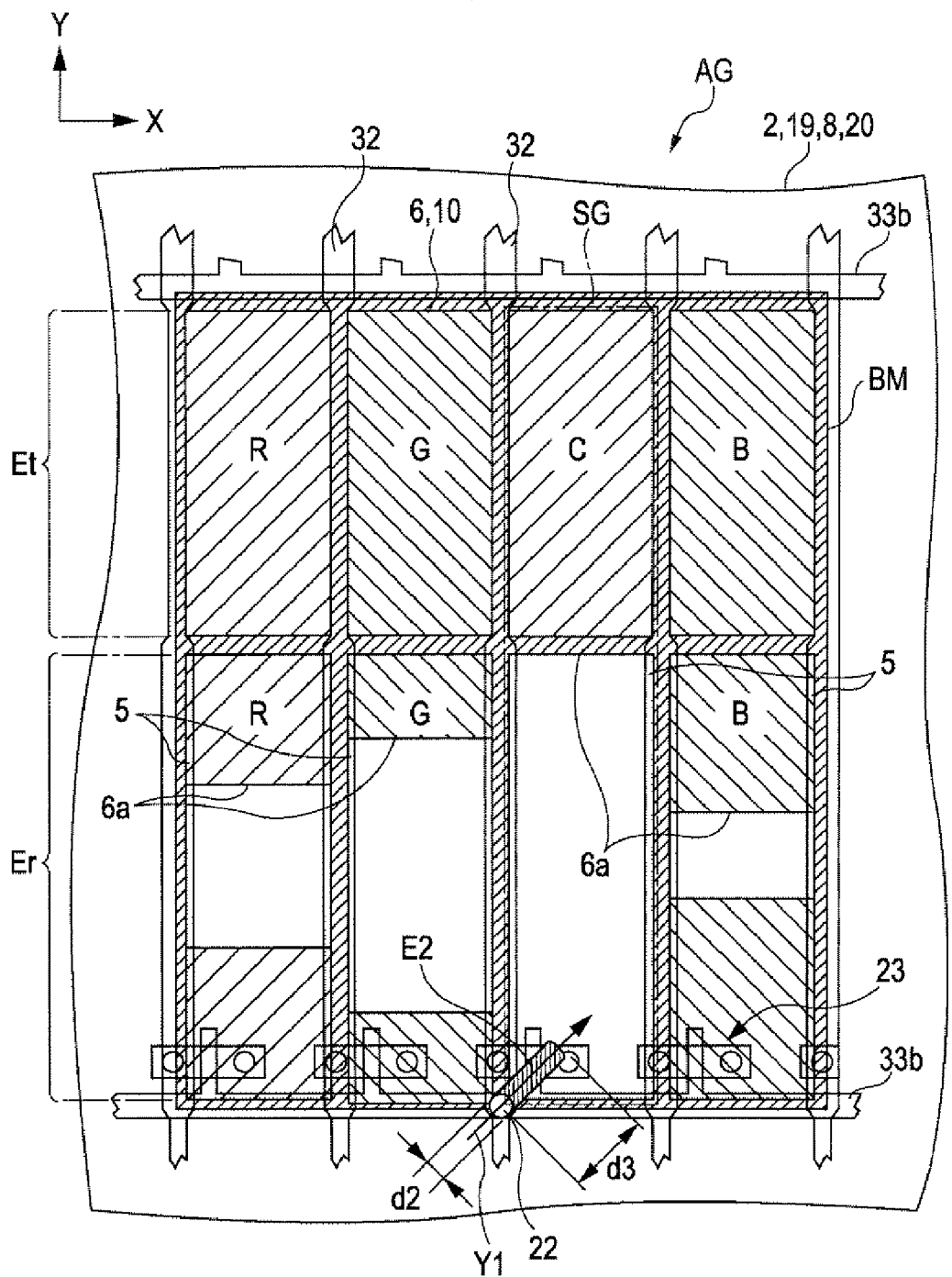
FIG. 15 is a plan view showing a pixel configuration and an alignment structure of a photospacer according to a tenth embodiment of the invention.

FIG. 15 corresponds to FIG. 11 and is a partial plan view showing a layout corresponding to one pixel according the tenth embodiment. In FIG. 15, in order to facilitate understanding of a relative positional relationship between the components of the color filter substrate 96 and the components of the element substrate 95, the pixel electrodes 10, the TFT elements 23, the source lines 32 and the second wires 33b of the gate lines 33, which are provided at the element substrate 95, are also shown. Hereinafter, the same components as the aforementioned embodiments will be denoted by the same reference numerals and their description will be simplified or omitted.

The tenth embodiment is different from the seventh embodiment in the configuration as follows.

That is, in the seventh embodiment, each of the sub pixel regions SG corresponding to the colored layers 6R, 6G and 6B includes the transmissive region Et and the reflective region Er and the sub pixel region SG corresponding to the colored layer 6C includes only the transmissive region Et. In contrast, in the tenth embodiment, each of the sub pixel regions SG corresponding to the colored layers 6R, 6G, 6B and 6C includes the transmissive region Et and the reflective region Er. In the seventh embodiment, the non-colored regions 6a are provided in the colored layers 6R, 6G and 6B corresponding to the reflective region Er. The tenth embodiment is similar to the seventh embodiment in that the non-colored regions 6a are provided in the colored layers 6R, 6G and 6B corresponding to the reflective region Er. However, the tenth embodiment is different from the seventh embodiment in that the colored layer 6C is not provided in the reflective region Er corresponding to the colored layer 6C and the entire reflective region Er thereof becomes the non-colored region. In the invention, instead of this configuration, a configuration that the colored layer 6C of cyan (C) is provided at a position corresponding to the reflective region Er and the area of the colored layer 6C is less than those of the colored layers 6R, 6G and 6B corresponding to the reflective region Er may be employed.

In the reflective region Er, the non-colored region 6a in the colored layer 6R, the non-colored region 6a in the colored layer 6G, the non-colored region 6a in the colored layer 6B and the non-colored region 6a in the colored layer 6C are different from one another in the size, and, in the reflective region Er, the areas of the colored layers 6R, 6G, 6B and 6C are relatively different from one another. By this configuration, adequate brightness and chroma can be obtained in the transmissive display mode and the reflective display mode.

In the tenth embodiment having the above-described configuration, the photospacer 22 is provided on the color filter substrate 96 at the position adjacent to the left lower corner of the sub pixel region SG corresponding to the colored layer 6C of cyan (C), the position corresponding to the intersection between the source line 32 and the second wire 33b of the gate line 33, and the position which overlaps the BM. Thus, the alignment-defective region E2 of the liquid crystal molecules, which occurs due to the photospacer 22, is disposed at the position corresponding to the reflective region Er and the position corresponding to the non-colored region 6a in the sub pixel region SG corresponding to cyan (C). Accordingly, it is possible to prevent the display quality from deteriorating due to the alignment-defective region E2 of the liquid crystal molecules, similar to the sixth embodiment.

Eleventh Embodiment

Next, an eleventh embodiment of the invention will be described with reference to FIG. 16.

Figure 16:
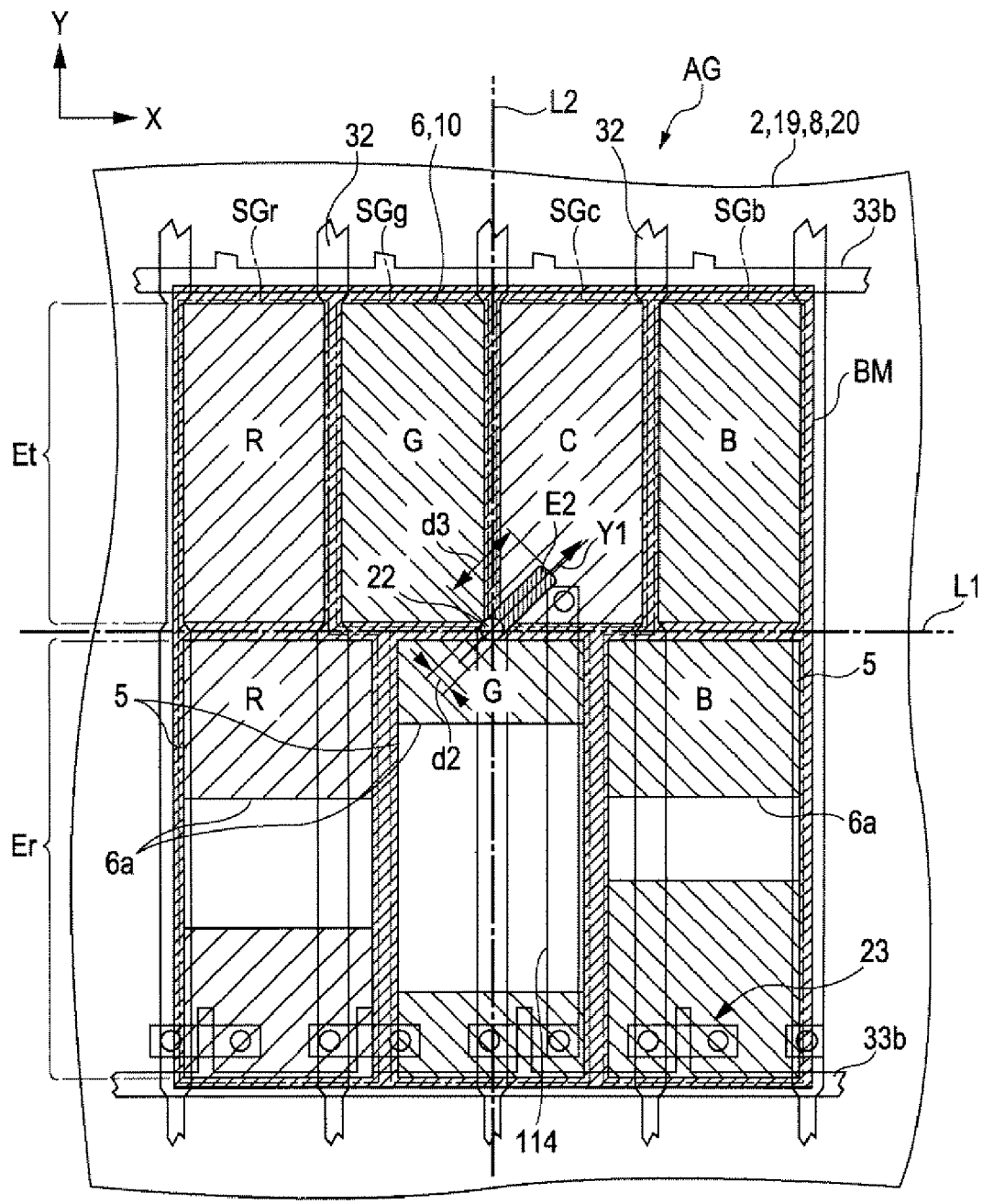
FIG. 16 is a plan view showing a pixel configuration and an alignment structure of a photospacer according to an eleventh embodiment of the invention.

FIG. 16 corresponds to FIG. 11 and is a partial plan view showing a layout corresponding to one pixel according to the eleventh embodiment. In FIG. 16, in order to facilitate understanding of a relative positional relationship between the components of the color filter substrate 96 and the components of the element substrate 95, the pixel electrodes 10, the TFT elements 23, the source lines 32 and the second wires 33b of the gate lines 33, which are provided at the element substrate 95, are also shown. Hereinafter, the same components as the aforementioned embodiments will be denoted by the same reference numerals and their description will be simplified or omitted.

The eleventh embodiment is different from the seventh embodiment in the configuration as follows.

That is, in the seventh embodiment, each of the sub pixel regions SG corresponding to the colored layers 6R, 6G and 6B includes the transmissive region Et and the reflective region Er and the sub pixel region SG corresponding to the colored layer 6C includes only the transmissive region Et. The eleventh embodiment is similar to the seventh embodiment in this point. However, in the eleventh embodiment, the areas of the colored layers 6R, 6G and 6B corresponding to the reflective region Er is greater than those of the colored layers 6R, 6G and 6B corresponding to the reflective region Er according to the seventh embodiment and the area of the sub pixel region SG (hereinafter, referred to as "sub pixel region SGc") of the colored layer 6C is significantly less than those of the sub pixel region SG (hereinafter, referred to as "sub pixel region SGr") of the colored layer 6R, the sub pixel region SG (hereinafter, referred to as "sub pixel region SGg") of the colored layer 6G and the sub pixel region SG (hereinafter, referred to as "sub pixel region SGb") of the colored layer 6B. The area of the colored layer 6R corresponding to the transmissive region Et, the area of the colored layer 6G corresponding to the transmissive region Et, the area of the colored layer 6C corresponding to the transmissive region Et and the area of the colored layer 6B corresponding to the transmissive region Et are substantially equal to one another. The area of the colored layer 6R corresponding to the reflective region Er, the area of the colored layer 6G corresponding to the reflective region Er and the area of the colored layer 6C corresponding to the reflective region Er are substantially equal to one another and greater than the area of the colored layer 6R corresponding to the transmissive region Et, the area of the colored layer 6G corresponding to the transmissive region Et, the area of the colored layer 6C corresponding to the transmissive region et and the area of the colored layer 6B corresponding to the transmissive region Et. The non-colored regions 6a are provided in the colored layer 6R, 6G and 6B corresponding to the reflective region Er and are relatively different from one another in the size. Accordingly, the areas of the colored layers 6R, 6G and 6C corresponding to the reflective region Er are relatively different from one another. By this configuration, adequate brightness and chroma can be obtained in the transmissive display mode and the reflective display mode. In addition, the BMs are formed at positions for partitioning the sub pixel region SGr, the sub pixel region SGg, the sub pixel region SGc and the sub pixel region SGb.

In the element substrate 95, the source lines 32 are provided between the colored layers 6 corresponding to the transmissive region Et, which are adjacent to each other in the X direction. Thus, the source lines 32 positioned between the colored layer 6R corresponding to the transmissive region Et and the colored layer 6G corresponding to the transmissive region Et overlaps a portion of the colored layer 6R positioned in the reflective region Er and the source line 32 positioned between the colored layer 6G corresponding to the transmissive region Et and the colored layer 6C corresponding to the transmissive region Et overlaps a portion of the colored layer 6G positioned in the reflective region Er, the source line 32 positioned between the colored layer 6C corresponding to the transmissive region Et and the colored layer 6B corresponding to the transmissive region Et overlaps a portion of the colored layer 6B positioned in the reflective region Er.

In the element substrate 95, the TFT element 23 for driving the pixel electrode 10 corresponding to the sub pixel region SGr is provided at the left lower corner of the sub pixel region SGr, the TFT element 23 for driving the pixel electrode corresponding to the sub pixel region SGg is provided from the right lower corner of the sub pixel region SGr to the left lower corner of the sub pixel region SGr, the TFT element 23 for driving the pixel electrode 10 corresponding to the sub pixel region SGc is provided at a position including the right lower corner of the sub pixel region SGg, and the TFT element 23 for driving the pixel electrode 10 corresponding to the sub pixel region SGb is provided at a position including the left lower corner of the sub pixel region SGb.

The semiconductor layer 102 of the TFT element 23 for driving the pixel electrode 10 corresponding to the sub pixel region SGc is disposed at the lower side of the reflective film 5 and is electrically connected to the pixel electrode 10 through a linear connection electrode 114 which extends to the sub pixel region SGc.

In the eleventh embodiment having the above-described configuration, the photospacer 22 is provided on the color filter substrate 96 at the position adjacent to the left lower corner of the colored layer 6C corresponding to the transmissive region Et, a position corresponding to an intersection between a straight line L1 which passes among the colored layers 6R, 6G, 6C and 6B corresponding to the transmissive region Et and the colored layers 6R, 6G and 6B corresponding to the reflective region Er and a straight line L2 which passes between the colored layer 6G corresponding to the transmissive region Et and the colored layer 6C corresponding to the transmissive region Et, and the position which overlaps the BM. Accordingly, the alignment-defective region E2 of the liquid crystal molecules, which occurs due to the photospacer 22, is disposed in the sub pixel corresponding to the colored layer 6C of the transmissive region Et. Accordingly, it is possible to prevent the display quality from deteriorating due to the alignment-defective region E2 of the liquid crystal molecules, similar to the first embodiment.

Modified Example

Although, in the aforementioned embodiments, the colored layers 6 are disposed in a stripe shape in the arrangement order of R, G, C and B, for each pixel region AG, the invention is not limited thereto. In the invention, as shown in FIG. 17, the color layers 6 corresponding to R, G, C and B are may be disposed in a paddy field shape or a mosaic shape, for each pixel region AG.

Figure 17:
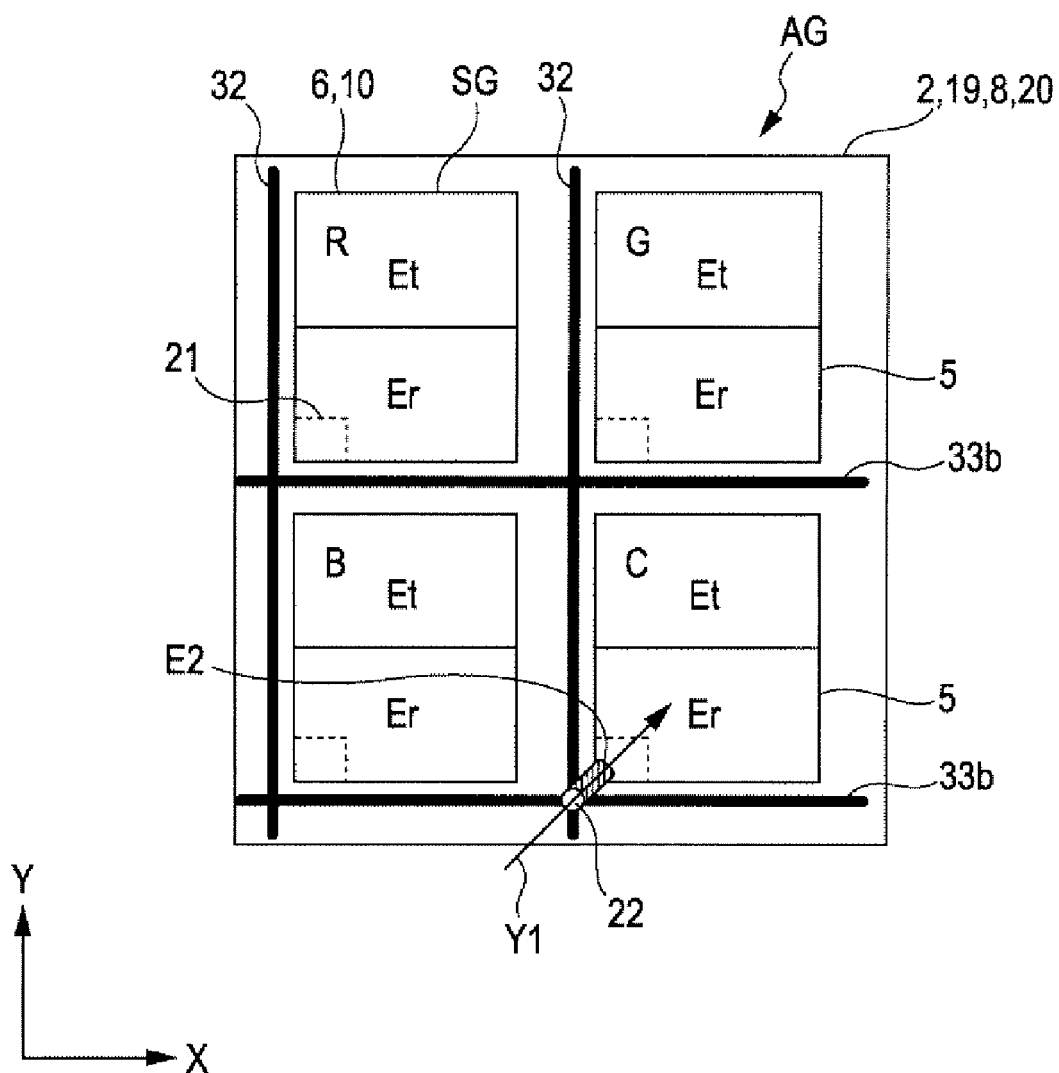
FIG. 17 is a plan view showing a pixel configuration and an alignment structure of a photospacer according to a modified example.

Now, the planar configuration of one pixel shown in FIG. 17 will be briefly described. In FIG. 17, the same components as the aforementioned embodiments are denoted by the same reference numerals and their description will be simplified or omitted.

Each of the sub pixel regions SG corresponding to the colored layers 6 includes the transmissive region Et and the reflective region Er. The colored layers 6 of R, G, C and B are disposed in the arrangement order shown in FIG. 17, but, in the invention, the arrangement order of R, G, C and B is not specially limited. In the color filter substrate, the BM (now shown) is provided at a position for partitioning the sub pixel regions SG.

In the element substrate, the TFT elements 21 are provided at the left lower corners in the sub pixel regions SG, the source lines 32 are provided between the sub pixel regions SG which are adjacent to each other in the X direction, and the second wires 33b of the gate lines 33 are provided between the sub pixel regions SG which are adjacent to each other in the Y direction.

Particularly, in this embodiment, the photospacer 22 is provided at the position adjacent to the left lower corner of the colored layer 6C of cyan (C) corresponding to the reflective region Er, the position corresponding to the intersection between the source line 32 and the second wire 33b of the gate line 33, and the position which overlaps the BM. Accordingly, the same effect as the aforementioned embodiments can be obtained.

Although, in the aforementioned embodiments and the modified example, the photospacer 22 is disposed at a predetermined position of the color filter substrate, the photospacer 22 may be disposed at a predetermined position of the element substrate.

Although, in the aforementioned embodiments, the photospacer 22 is provided on the color filter substrate at the position adjacent to the left lower corner of the colored layer 6C of cyan (C) corresponding to the reflective region Er, the position corresponding to the intersections between the source line 32 and the second wire 33b of the gate line 33 and the position which overlaps the BM, the invention is not limited thereto. In the invention, the photospacer 22 may be provided on the color filter substrate at the position adjacent to the left lower corner of the colored layer 6 of complementary colors such as yellow (Y) or magenta (M) instead of cyan (C), the position corresponding to the intersection between the source line 32 and the second wire 33b of the gate line 33 and the position which overlaps the BM.

Although, in the aforementioned embodiments and modified example, the invention applies to the transmissive type liquid crystal device or the semi-transmissive reflective type liquid crystal device, the invention is not limited thereto and is applicable to a reflective type liquid crystal device. Although, in the aforementioned embodiments, the invention applies to the liquid crystal device having a three-terminal element such as the TFT element, the invention is not limited thereto and is applicable to a liquid crystal device having a two-terminal non-linear element such as a thin film diode (TFD).

In the invention, the position of the photospacer 22 is not limited to the aforementioned embodiments and modified example, the photospacer 22 may be disposed at the position which overlaps the gate line 33 for driving the sub pixel corresponding to the colored layer 6C of cyan (C), the source line 32 for driving the sub pixel corresponding to the colored layer 6C of cyan (C) or the pixel electrode 10 corresponding to cyan (C) in a two-dimensional direction. Similar to the aforementioned embodiments and modified example, the invention is not limited to the configuration that the photospacer 22 is disposed for each sub pixel corresponding to the colored layer 6C of cyan (C). In the invention, the photospacer 22 may be disposed for each of the plurality of sub pixel units corresponding to the colored layer 6C of cyan (C).

In the invention, in the aforementioned embodiments and modified example, the colored layers 6R, 6G, 6C and 6B may be formed in the stripe shape to overlap the pixel electrode 10 which is arranged in the Y direction.

In the embodiments of the invention, the non-colored region 6a may be disposed in at least one of the colored layers 6R, 6G and 6B corresponding to the reflective region Er or at least one of the colored layer 6R, 6G, 6B and 6C corresponding to the reflective region Er.

The invention applies to a liquid crystal device in which an alignment film is subjected to the rubbing process, such as a fringe field switching (FFS) liquid crystal device or an in-plane switching (IPS) liquid crystal device. The invention is not limited to the aforementioned embodiments and modified example and may be changed without departing from the spirit of the invention.

Method of Converting Display Image

Next, in the liquid crystal device 100 according to the aforementioned embodiments, a method of converting image signals of RGB into image signals of RGBC will be described. This method is not limited to the liquid crystal device 100 and is applicable to the liquid crystal devices according to the aforementioned embodiments and modified example.

Figure 18:
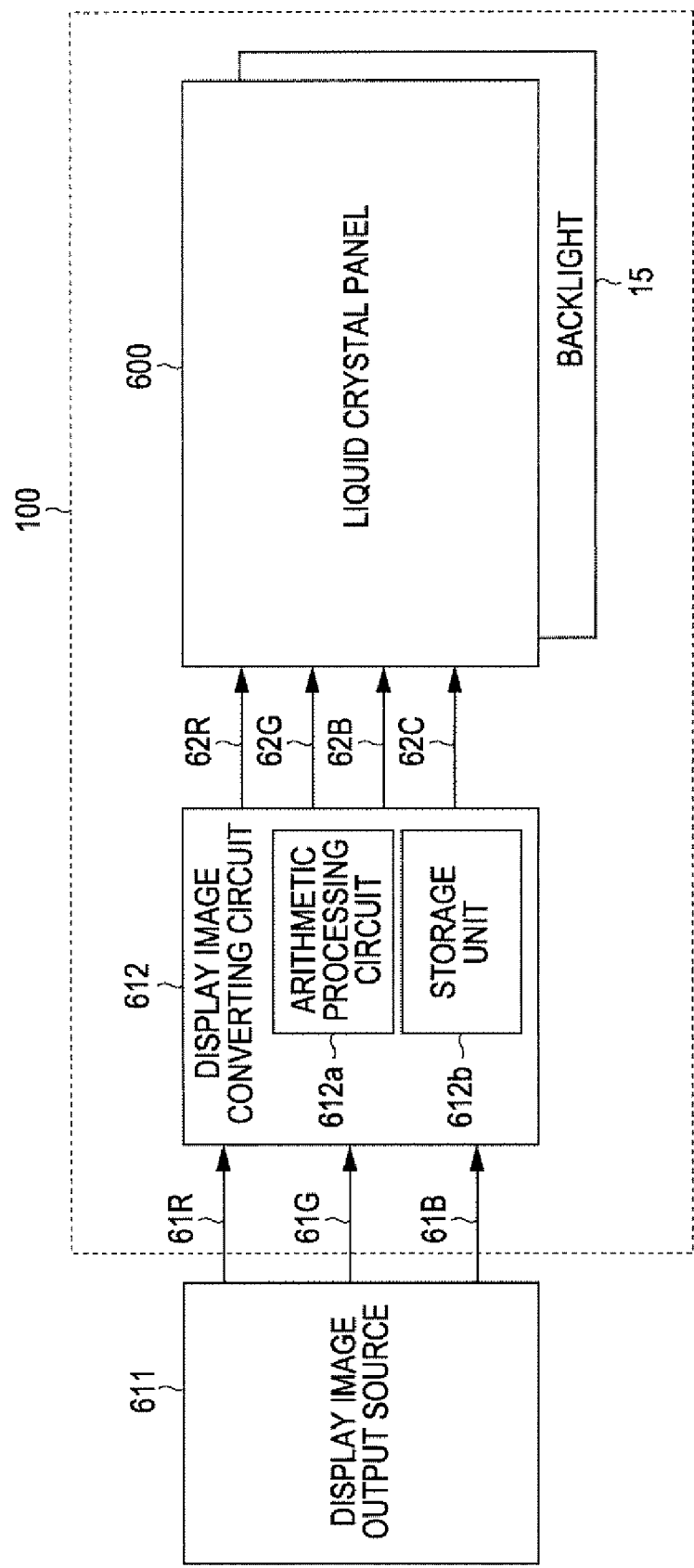
FIG. 18 is a schematic view showing a method of converting a display image of the liquid crystal device according to the first embodiment of the invention.

FIG. 18 is a schematic diagram of the liquid crystal device 100. In the liquid crystal device 100, when the input image signals of RGB are converted into the image signals of RGBC, the liquid crystal device 100 has a display image converting circuit 612. The display image converting circuit 612 serves to convert the image signals of RGB output from an external display image output source 611 such as a personal computer into the image signals of RGBC and to output the image signals to a liquid crystal display panel 600.

The display image converting circuit 612 includes an arithmetic processing circuit 612a such as central processing unit (CPU) and a storage unit 612b such as a random access memory (RAM). The arithmetic processing circuit 612a converts the image signals 61R, 61G and 61B, which are the input images of RGB output from the display image output source 611, into the image signals 62R, 62G, 62B and 62C of RGBC. In the storage unit 612b, a look-up table (LUT) in which the image signals of RGB each having predetermined intensity correspond to the image signals of RGBC each having the intensity corresponding thereto, respectively, is provided. For example, when the image signals of RGB for displaying cyan (C), for example, the image signals of RGB having intensities of R=0, G=100 and B=100, respectively, are input to the arithmetic processing circuit 612a, the arithmetic processing circuit 612a acquires the image signals of RGBC having the intensities (for example, R=0, G=10, B=10 and C=100) corresponding to the image signals of RGB from the LUT of the storage unit 612b and outputs the image signals of RGBC to the liquid crystal display panel 600. Accordingly, cyan (C) as well as the colors of RGB can be displayed on the display screen of the liquid crystal display panel 600. Accordingly, even when the image signals of RGB are input as the input image signal, the color reproduction range of the output image can be magnified to the color reproduction range including cyan.

In the aforementioned embodiments and modified example, the colored regions including the colored layers 6R, 6G, 6B and 6C correspond to the respective sub pixels such that four colored regions configure one pixel region AG. The four colored regions may include a colored region of blue color series, a colored region of red color series and two colored regions of two colors selected from blue to yellow in a visible light region (380 to 780 nm) of which the color varies depending on a wavelength. In the series used therein, for example, the blue color series are not limited to pure blue and includes blue violet, blue green or the like. The red color series are not limited to pure red and includes orange. Each of the colored regions may include a single colored layer or a plurality of colored layers of different colors laminated therein. Although each of the colored regions is described by color, the color may be set by adequately changing chroma and brightness.

The color range of the four colored regions, for example, the color range of the colored region of blue color series is from blue violet to blue green, and more preferably from indigo blue to blue. The color range of the colored region of red color series is from orange to red. The color range of one colored region of a color from blue to yellow is from blue to green and more preferably from blue green to green. The color range of the other colored region of a color from blue to yellow is from green to orange and more preferably from green to yellow or from green to yellow green. The colored regions do not use the same color. For example, one of the two colored regions of colors selected from blue to yellow uses green color series, the other thereof uses blue color series or yellow green color series. Accordingly, it is possible to realize a wider range of color reproducibility compared with the colored region of RGB. The colored layer 6C is included in the colored region of a color from blue to green. Accordingly, even when the colored regions 6R, 6G, 6B and 6C are set to four colored regions including a colored region of blue color series, a colored region of red color series, a colored region of a color from green to orange and a colored region of a color from blue to green, the same effect is obtained.

Although the wider range of color reproducibility is described by color, the color of the colored region is set based on the wavelength peak of the light transmitted therethrough. For example, the colored region of blue color series has a wavelength peak of 415 to 500 nm and more preferably 435 to 485 nm. The colored region of red color series has a wavelength peak of 600 nm or more and more preferably 605 nm or more. One colored region of the color from blue to yellow has a wavelength peak of 485 to 535 nm and more preferably 495 to 520 nm. The other colored region of the color from blue to yellow has a wavelength peak of 500 to 590 nm and more preferably 510 to 585 nm or 530 to 565 nm.

The four colored regions may be set by a xy chromaticity diagram. The colored region of blue color series has $x \leq 0.151$, $y \leq 0.056$ and more preferably $0.134 \leq x \leq 0.151$, $0.034 \leq y \leq 0.056$. The colored region of red color series has $0.643 \leq x$, $y \leq 0.333$ and more preferably $0.643 \leq x \leq 0.690$, $0.299 \leq y \leq 0.333$. One colored region of the color from blue to yellow has $x \leq 0.164$, $0.453 \leq y$ and more preferably $0.098 \leq x \leq 0.64$, $0.453 \leq y \leq 0.759$. The other colored region of the color from blue to yellow has $0.257 \leq x$, $0.606 \leq y$ and more preferably $0.257 \leq x \leq 0.357$, $0.606 \leq y \leq 0.670$.

When the sub pixel includes the transmissive region and the reflective region, the four colored regions applies to the transmissive region and the reflective region in the above-described range.

Examples of the components of the four colored regions are as follows:

(1) colored regions of red, blue, green and cyan (blue green)

(2) colored regions of red, blue, green and yellow (3) colored regions of red, blue, dark green and yellow (4) colored regions of red, blue, emerald and yellow (5) colored regions of red, blue, dark green and yellow green (6) colored regions of red, blue green, dark green and yellow green Electronic Apparatus Next, an example of an electronic apparatus using the liquid crystal device 100 according to each of the aforementioned embodiments and modified example will be described with reference to FIG. 19.

Figure 19A:
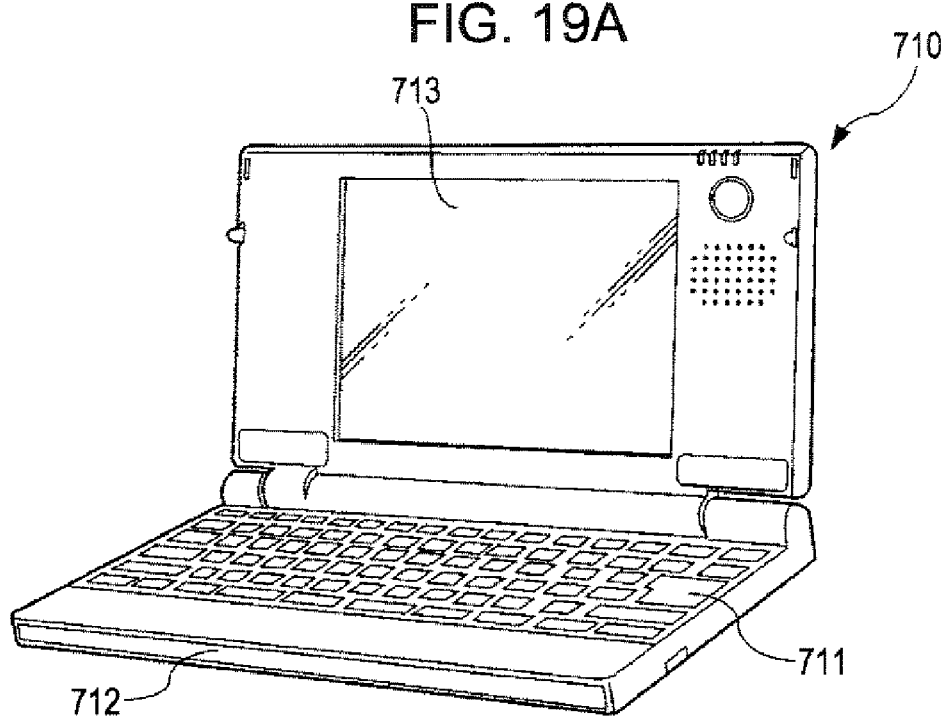
FIG. 19 shows an example of an electronic apparatus using the liquid crystal device according to the invention.

First, an example that the liquid crystal device 100 according to each of the embodiments or modified example is used in a display unit of a portable personal computer (that is, a notebook-type computer) will be described. FIG. 19A is a perspective view showing a configuration of the personal computer. As shown in FIG. 19A, the personal computer 710 includes a main body unit 712 having a keyboard 711 and a display unit 713 using the liquid crystal device 100 according to the invention.

Figure 19B:
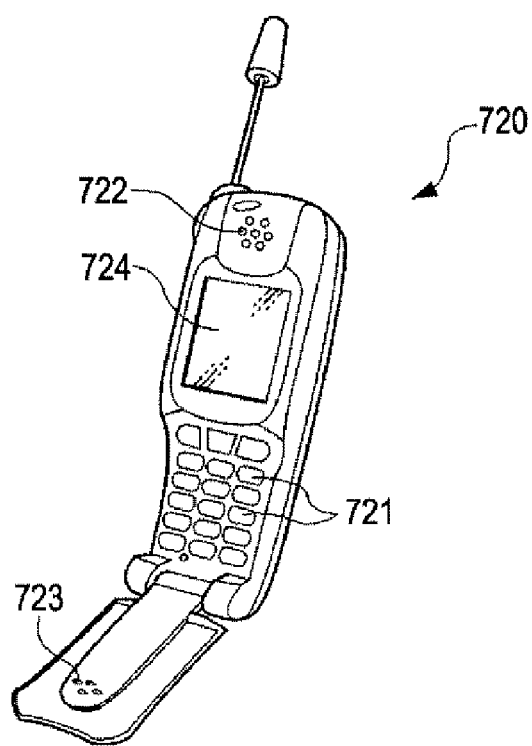

Subsequently, an example that the liquid crystal device 100 according to each of the embodiments or modified example is used in a display unit of a mobile telephone will be described. FIG. 19B is a perspective view showing a configuration of the mobile telephone.

The mobile telephone 720 includes, as shown in FIG. 19B, a plurality of operation buttons 721, an earpiece 722, a mouthpiece 723, and the display unit 724 using the liquid crystal device 100 according to the invention.

Electronic devices using the liquid crystal device 100 according to each of the embodiments or the modified example of the invention include, not only the personal computer shown in FIG. 19A or the mobile telephone shown in FIG. 19B, but also liquid crystal televisions, videotape recorders of the viewfinder type or monitor type, car navigation systems, pagers, digital diaries, calculators, word processors, workstations, videophones, point-of-sales (POS) terminals, or digital still cameras, etc.

The entire disclosure of Japanese Patent Application No. 2005-273310, filed Sep. 21, 2005 and No. 2005-303257, filed Oct. 18, 2005 are expressly incorporated by reference herein.

What is claimed is:

1. A liquid crystal device, comprising:
   a liquid crystal layer interposed between a first substrate and a second substrate;
   a plurality of pixels including a first pixel corresponding to a color of a blue color series, a second pixel corresponding to a color of a red color series, a third pixel corresponding to a color of a green color series, and a fourth pixel corresponding to a complementary color of the blue color series, the red color series or the green color series;
   a spacer which defines a thickness of the liquid crystal layer, the spacer being formed to one of the first substrate and the second substrate which is subjected to a rubbing process; and
   a domain region formed near the spacer, the domain region being unable to align liquid crystal molecules of the liquid crystal layer,
   wherein the domain region overlaps the fourth pixel; and
   wherein an area of the fourth pixel is less than an area of each of the other pixels.

2. The liquid crystal device according to claim 1, further comprising:
   a reflective region for reflective display;
   a transmissive region for transmissive display; and
   a step-difference forming film which is provided at a position corresponding to the reflective region,
   wherein the spacer is provided on the step-difference forming film.

3. The liquid crystal device according to claim 2, wherein the fourth pixel has a colored region corresponding to the respective color, and wherein the pixel has a region where no colored region is provided.

4. The liquid crystal device according to claim 3, wherein the domain region is positioned in the region where no colored region is provided.

5. The liquid crystal device according to claim 1, further comprising:
   a gate line;
   a source line; and
   a switching element which is connected to the gate line and the source line;
   wherein the fourth pixel includes a pixel electrode that is connected to the switching element, and
   wherein the spacer overlaps at least one of the gate line, the source line, the switching element and the pixel electrode.

6. The liquid crystal device according to claim 1, further comprising a light shielding film provided at a position corresponding to the domain region.

7. The liquid crystal device according to claim 1, further comprising a light shielding film that compartments the fourth pixel, wherein the light shielding region has a part which is not provided at a position corresponding to the domain region.

8. The liquid crystal device according to claim 2, wherein the fourth pixel has a colored region corresponding to the respective color, and wherein the optical concentration of the colored region provided in correspondence with the reflective region is less than that provided in correspondence with the transmissive region.

9. The liquid crystal device according to claim 1, wherein the fourth pixel has a colored region that includes a transmissive region for transmissive display, and
   wherein the other of the pixels, among the plurality of pixels, includes both the transmissive region for transmissive display and the reflective region for reflective display.

* * * * *